US012249747B2

(12) United States Patent
Carlred et al.

(10) Patent No.: US 12,249,747 B2
(45) Date of Patent: Mar. 11, 2025

(54) NON-CONTACTING WAVEGUIDE FLANGE ADAPTER ELEMENT HAVING QUASI-PERIODIC PROTRUDING ELEMENTS CONFIGURED TO PASS WAVES IN ONE DIRECTION AND STOP WAVES IN OTHER DIRECTIONS

(71) Applicant: GAPWAVES AB, Gothenburg (SE)

(72) Inventors: Simon Carlred, Västra Frölunda (SE); Esperanza Alfonso Alós, Västra Frölunda (SE); Per-Simon Kildal, Pixbo (SE)

(73) Assignee: GAPWAVES AB, Gothenburg (SE)

( * ) Notice: Subject to any disclaimer, the term of this patent is extended or adjusted under 35 U.S.C. 154(b) by 0 days.

(21) Appl. No.: 18/513,706

(22) Filed: Nov. 20, 2023

(65) Prior Publication Data

US 2024/0204383 A1 Jun. 20, 2024

Related U.S. Application Data

(63) Continuation of application No. 17/156,702, filed on Jan. 25, 2021, now abandoned, which is a continuation of application No. 16/098,856, filed as application No. PCT/SE2016/050387 on May 3, 2016, now abandoned.

(51) Int. Cl.
*H01P 1/04* (2006.01)
*H01P 5/02* (2006.01)

(52) U.S. Cl.
CPC .............. *H01P 1/042* (2013.01); *H01P 5/024* (2013.01)

(58) Field of Classification Search
CPC ........... H01P 1/042; H01P 5/028; H01P 5/024
USPC .......................................................... 333/254
See application file for complete search history.

(56) References Cited

U.S. PATENT DOCUMENTS

2011/0032057 A1 2/2011 Lin

FOREIGN PATENT DOCUMENTS

| | | |
|---|---|---|
| WO | 2010/003808 | 1/2010 |
| WO | 2014/174494 | 10/2014 |
| WO | 2016/63932 | 10/2016 |

OTHER PUBLICATIONS

Written Opinion issued in PCT/SE2016/050387, Nov. 6, 2018, pp. 1-6.
International Preliminary Report on Patentability, issued in PCT/SE2016/050387, Nov. 6, 2018, pp. 1-7.
International Search Report issued in PCT/SE2016/050387, Aug. 2, 2017, pp. 1-3.

(Continued)

*Primary Examiner* — Benny T Lee
(74) *Attorney, Agent, or Firm* — Jeffrey S. Melcher; Melcher Patent Law PLLC

(57) ABSTRACT

An arrangement (100) for interconnection of waveguide structures (10,20) or components comprising a number of waveguide flange adapter elements (100) having a surface of a conductive material with a periodic or quasi-periodic structure (15) formed by a number of protruding elements (115) arranged or designed to allow waves to pass across a gap between a surface around a waveguide opening (3) to another waveguide opening in a desired direction or waveguide paths, at least in an intended frequency band of operation, and to stop propagation of waves in the gap in other directions.

21 Claims, 21 Drawing Sheets

(56) References Cited

OTHER PUBLICATIONS

The Institution of Electrical Engineers, Stevenage, GB; 2012, Pucci E et al: "Contactless Non-Leaking Waveguide Flange Realized by Bed of Nails for Millimeter Wave Applications", Database accession No. 12772144 cited in the application ; & 2012 6th European Conference On Antennas and Propagation (EUCAP), pp. 3533-3536, Proceedings of the 2012 6th European Conference on Antennas and Propagation (EuCAP) IEEE Piscataway, NJ, USA DOI: 10.1109/EUCAP.2012.6206199 ISBN: 978-1-4577-0918-0.
Rahiminejad Sofia et al: "Polymer Gap Adapter for Contactless, Robust, and Fast Measurements at 220-325 GHz", Journal of Microelectromechanical Systems, IEEE Service Center, US, vol. 25, No. 1, Feb. 1, 2016 (Feb. 1, 2016), pp. 160-169.
Vosoogh Abbas et al: "A multi-layer gap waveguide array antenna suitable for manufactured by die-sink EDM", 2016 10th European Conference On Antennas and Propagation (EUCAP), European Association of Antennas and Propagation, Apr. 10, 2016 (Apr. 10, 2016), pp. 1-4.
Fan Fangfang et al: "Half-height pins—a new pin form in gap waveguide for easy manufacturing", 2016 10th European Conference On Antennas and Propagation (EUCAP), European Association of Antennas and Propagation, Apr. 10, 2016 (Apr. 10, 2016), pp. 1-4.
Office Action issued in corresponding Japanese patent application No. JP-21106340, Jan. 7, 2020, pp. 1-13.
Li, "An Improved Ring-Centered Waveguide Flange for Millimeter and Submillimeter Wave Applications," National Radio Astronomy Obsrvatory, Charlottsville, VA 22903, 2010, pp. 1-4.
Shang, "Measurements of micromachined submillimeter waveguide circuits," Nov. 2010, www.researchgate.net/publication/234092362, Conference paper, pp. 1-5.
Wang, "Measurements of micromachined waveguide devices at WR-3 band using a T/RT module based network analyzer," Conference paper, Jun. 2011, www.researchgate.net/publication/234092364, pp. 1-5.
Rahiminejad, "SU8 ridge-gap waveguide resonator," Chalmers University of Technology, https://research.chalmers.se, Nov. 2, 2021, pp. 1-14.
Hesler, "A photonic crystal joint (PCJ) for metal waveguides," University of Virginia, Charlottesville, VA 22903, 2001, IEEE MTT-S Digest, pp. 1-4.
Lau, "An innovation waveguide interface and quarter-wavelength shim for the 220-325 ghz band," OML, Inc. Morgan Hill, CA, 2012 IEEE, pp. 1-4.
Lau, "An innovative waveguide interface for millimeter wave and sub-millimeter wave applications," OML, Inc., Morgan Hill, CA, 2007 IEEE, pp. 1-8.
Chow, "Measurements to 320 ghz of millimeter-wave waveguide components made by high precision economic micro-machining techniquies," Institute of Microwaves and Photonics Deparatment of Electronics and Electrical Engineering, University of Leeds, 2003 IEEE, pp. 1-4.
Pucci, "Contactless non-leaking waveguide flange realized by bed of nails for millimeter wave applications," Department of Signals and Systems Chalmers University of Technology, Gothenberg, Sweden, 2011 IEEE, pp. 1-4.
Zaman, "Gap Waveguide PMC packaging for improved isolation of circuit components in high-frequency microwave modules," IEEE transactions on compenents, packaging and manufacturing technology, vol. 4, No. 1, Jan. 2014, pp. 1-10.
Pucci, "Study of Q-factors of ridge and grove gap waveguide resonators," IET Mircowaves, Antenas & Propagation, 2013, vol. 7, Iss 1, pp. 900-908.
Brazalez, "Improved microstrip filters using PMC packaging by lid of nails," IEEE Transactions on components, packaging and manufacturing technology, vol. 2, No. 7, Jul. 2012, pp. 1075-1084.
Alos, Ka-band gap waveguide coupled-resonator filter for radio link diplexer application, IEEE Transactions on components, packaging and manufacturing technology, vol. 3, No. 5, May 2013, p. 870.
Kerr, "Mismatch caused by waveguide tolerances, corner radii, and flange management," National Radio Astronomy Obersvatory, Electronics Division Technical Note No. 215, Jan. 11, 2010, pp. 1-4.
Pucci, "Contactless non-leaking waveguide flange realized by bed of nails for millimeter wave applications," 6th European conference on antennas and propagation, IEEE 2011, pp. 3533-3536.
Rajo-Iglesias, "Numerical studies of bandwith of parellel-plate cut-off realised by a bed of nails, corrugations and mushroom-type electromagnetic bandgap for use in gap waveguides," IET Mircowaves, Antennas & Propagation, 2013, vol. 5, Iss 3, pp. 282-289.
Kildal, "Local metamaterial-based waveguides in gaps between parallel metal plates," 2009, IET Antennas & Propagation, vol. 8, pp. 84-87.
Kerr, "Waveguide flanges for ALMA instrumentation," Nov. 8, 1999, ALMA Memo No. 278, pp. 1-15.
Oleson, Millimeter wave vector analysis calibration and measurement problems caused by common waveguide irregularities, www.oml-mmw.com, pp. 1-9.
Horibe, "Modification of waveguide flange design for millimeter and submillimeter-wave measurements," IEEE, 2011, pp. 1-7.
Pucci, "Planar dual-mode horn array with corporate-feed network in inverted microstrip gap waveguide," IEE Transactions on antennas and propagation, vol. 62, No. 7, Jul. 2014, pp. 3534-3542.
Rahiminejad, "Contactless pin-flange adapter for high-frequency measurements," Sep. 9-12, 2012, Ilmenau, Germany, pp. 1-5.
Rahiminejad, "Micromachined contactless pin-flange adapter for robust high-frequency measurements," J. Micromech. Microeng. 24 (2014), pp. 1-12.
Li, "Repeatability and mismatch of waveguide flanges in the 500-750 ghz band," IEEE transactions on terahertz and technology, vol. 4, No. 1, Jan. 2014, pp. 39-48.
Lau, "Understanding the residual waveguide interface variations on millimeter wave calibration," OML, Inc., 300 Digital Drive, Morgan Hill, CA 95017, pp. 1-14.
Shang, "WR-3 band wjaveguides and filters fabricated using SU8 photresist micromachining technology," IEEE transactions on terahertz and technology, vol. 2, No. 6, Nov. 2012, pp. 629-637.

NON-CONTACTING WAVEGUIDE FLANGE ADAPTER ELEMENT HAVING QUASI-PERIODIC PROTRUDING ELEMENTS CONFIGURED TO PASS WAVES IN ONE DIRECTION AND STOP WAVES IN OTHER DIRECTIONS

FIELD OF THE INVENTION

The present invention relates to an arrangement for interconnection of waveguide structures. The invention relates to arrangements for use in the high, or very high, frequency region, for example, above 30 GHz, or even above 300 GHz, but also for frequencies below 30 GHz. The invention also relates to a structure for an arrangement for interconnecting waveguide structures.

BACKGROUND OF THE INVENTION

For measuring and/or analyzing microwave or millimeter circuits and devices of different kinds, for example, from filters, amplifiers etc. to much more complex multifunction systems, but also for other purposes, waveguide structures need to be interconnected, and normally so called “waveguide flanges” are used as transitions. The requirements for a good conductive contact between waveguide flange surfaces are high. Unless the conductive contact is very good, currents will flow between the flanges, resulting in a leakage, mismatch and losses which will reduce the performance of the circuit, and produce incorrect results in the case of measurements and calibrations, particularly at high frequencies. In order to assure a good conductive, electrical, contact, waveguide flanges need to be tightly and evenly connected to each other, for example, a waveguide flange has to be tightly and evenly connected to a device under test or to a calibration arrangement. In addition, an extremely good waveguide machining is required in order to assure a good alignment between waveguide flanges. These are difficult and time-consuming operations, in particular if several measurements need to be done, and may lead to incorrectly attached systems.

In E. Pucci, P-S.Kildal, “Contactless Non-Leaking waveguide flange Realized by Bed of Nails for millimeter wave Applications”, 6$^{th}$ European Conference on Antennas and Propagation (EUCAP), pp. 3533-3536, Prague, March 2012, a waveguide flange which is realized by a bed of pins, and working between 190 and 320 GHz is proposed. This flange, with a pin structure or a textured surface does not require a conductive contact when connected to a standard waveguide, which facilitates fabrication and mounting. The screws need not be tightened very well and it is not needed to assure a good electrical contact as is the case with standard waveguide flanges. However, it is a disadvantage that it may still be a difficult and a time consuming operation to fasten the screws to connect the waveguide flange, even if the requirements as to tightening the screws are reduced, and similarly it is time consuming to loosen, remove, the screws at disconnection.

In S. Rahiminejad, E. Pucci, V. Vassilev, P-S.Kildal, S. Haasl, P. Enoksson, “Polymer Gap adapter for contactless, Robust, and fast Measurements at 220-325 GHz”, Journal of Microelectromechanical Systems, Vol. 25, No. I, February 2016, a double-sided pin-flange gap adapter is disclosed which is to be placed between two flanges to avoid leakage. The adapter has a drawback in that mechanical contact still is required, although no electrical contact is needed. The mechanical contact is assured by means of screws as in other known arrangements, and the adapter has a drawback in that, if the screws are tightened too much, the adapter may easily be destroyed, or the adapter can result in pin marks in the sensitive flange surfaces, which then may be ruined.

Since, as also referred to above, particularly, but not exclusively, for high frequencies, for example, from about 10 GHz, or particularly from 30 GHz up to about 1 THz, when connecting two waveguide flanges there is required a high quality of both mechanical and electrical, or at least mechanical, contact between the waveguide flanges, in order to obtain a high quality, a repeatable and non-radiating interface, and a low loss interconnection, for example, allowing a good calibration or a reliable measurement.

However, the flanges or adapters discussed above have shown not to be suitable for production and operation at, for example, 60 GHz, or from 50-75 GHz, which is a wide band. Actually, none of the designs are suitable for V-band flanges, which is a problem.

Further, in for example, a typical calibration procedure the operator has to connect the flanges of calibration standards and ports of a VNA, Vector Network Analyzer, a plurality of times. This is a very time consuming, complicated and tedious task, due to all the screws needed to achieve a good contact between all joining flanges. The calibration procedure requires a stable and repeatable contact both mechanically and electrically, or at least mechanically, and therefore four screws should always used, but due to the time consuming and tedious work, sometimes for example, only two of the required number of screws, for example, four, required to ensure a good electrical contact, are actually tightened in practice. If the connection is not perfect, for example, if there is a slight angular displacement or if there is not a perfect fit, there may be a leakage from the waveguide into free space, and also an increased reflection at the connection. A calibration procedure, as well as a measurement procedure, is based on all such connections being as perfect as possible.

Thus, although, through the solutions discussed above, the need for a conductive or electric contact between waveguide structures, or waveguide flanges, is removed, there is still a need for improvement as far as waveguide structure interconnecting arrangements are concerned. There is also a need for providing arrangements and structures appropriate for different and other frequency bands.

SUMMARY OF THE INVENTION

It is therefore an object of the present invention to provide an arrangement for interconnection of waveguide structures through which one or more of the above-mentioned problems can be overcome.

It is particularly an object to provide an arrangement for interconnection of waveguide structures, which is easy to use and operate.

It is also an object to provide an arrangement for interconnection of waveguide structures which enables interconnection in a fast and reliable manner with a minimum of interconnecting, for example, minimizing screwing and unscrewing, minimizing operations for joining/disconnecting waveguide flanges, and thereby facilitating interconnection, for example, for analysis, calibration or measurement of microwave or millimeter wave circuits or devices.

It is a particular object to provide an arrangement for interconnection of waveguide structures which can be used for high frequencies, for example, above 10 GHz, or particularly above 30 GHz, but also for lower frequencies without any risk of reduced performance, measurement errors or calibration errors due to misalignment or leakage between interconnected waveguide structures, for example, waveguide flanges.

It is a particular object to provide an arrangement, and a structure respectively, appropriate for different, and additional, frequency band, most particularly also for the frequency band 50-75 GHz, for example, for 60 GHz, and even more particularly for interconnection of V-band flanges.

Particularly, it is an object to provide an arrangement for interconnection of waveguide structures which is easy and inexpensive to fabricate.

It is a general object to provide an arrangement through which interconnection as well as disconnection of waveguide structures is facilitated.

It is also an object to provide an interconnecting arrangement, and a surface structure, which is robust and suitable with respect to manufacture for different frequency bands, or independently of which is the desired frequency band.

Another object is to provide a flexible solution that can be implemented for interconnection of waveguide structures for operation in different desired frequency bands.

A most particular object is to provide an arrangement for interconnection of waveguide structures which is suitable for being used for interconnections, for example, in measurement systems for high as well as for low frequencies, in connection with different standard waveguides dimensions (such as WR15, WR12, . . . WR3) and the corresponding standard waveguide flange dimensions, and for different and wide frequency bands.

A particular object is to provide an interconnection arrangement which can be used for interconnection of standard waveguide flanges.

A further particular object is to provide an interconnecting arrangement for connecting an analyzing or measuring instrument to a waveguide calibration standard or a device under test in such a way that existing calibration standards can be used and such that connection/disconnection can be done in an easier and faster manner than before.

Therefore an interconnecting arrangement as initially referred to comprises:

- a waveguide flange adapter element having a first waveguide opening and being configured to provide an interconnection between first and second waveguide structures;
- a first waveguide flange of the first waveguide structure having a second waveguide opening;
- the waveguide flange adapter element comprising a first surface of a conductive material with a periodic or quasi-periodic structure formed by a number of protruding elements surrounding the first waveguide opening;
- an interconnector configured to releasably or fixedly interconnect the waveguide flange adapter element to the first waveguide flange without requiring electrical contact and to provide a first gap between a second surface around the first waveguide opening and the second waveguide opening and provide a second gap between the first surface and a third surface around the second waveguide opening assuring that the first surface is not in direct mechanical contact with the third surface of the waveguide flange, wherein the number of protruding elements surrounding the first waveguide opening allow waves to pass across the first gap in a desired direction or waveguide path, at least in an intended frequency band of operation, and that stop propagation of waves in the first gap in other directions;
- wherein the second gap is smaller than λ/4, where λ is a wavelength in a medium surrounding the protruding elements of a waveguide signal to be measured,
- the interconnector comprises a rim, a ridge, a protective element or layer, or a supportive element or layer that at least partly surrounds the periodically or quasi-periodically arranged protruding elements to provide the second gap; and
- wherein the waveguide flange adapter element comprises alignment pin holes substantially symmetrically disposed around, and at a distance from, the first surface, and the waveguide flange is aligned with respect to the first waveguide flange by alignment pins introduced into the alignment pin holes and into cooperating pin holes in the first waveguide flange to interconnect the waveguide flange to the first waveguide flange.

Also provided is an arrangement for interconnecting waveguide components comprising:

- first and second waveguide flange adapter elements, the first waveguide flange adapter element comprising a first surface of a conductive material with a periodic or quasi-periodic structure formed by a number of first protruding elements surrounding a first waveguide opening, the second waveguide flange adapter element comprising a second surface of a conductive material with a periodic or quasi-periodic structure formed by a number of second protruding elements surrounding a second waveguide opening;
- a first protruding element of the first protruding elements faces a second protruding element of the second protruding elements;
- the facing first and second protruding elements each have a height or length such that a total height or length of the facing first and second protruding elements is a full length of the periodic or quasi-periodic structure needed to stop propagation of waves inside a second gap between the two waveguide flange adapter elements in any direction and to allow waves to pass across a first gap from the first waveguide opening to the second waveguide opening in an intended frequency band;
- an interconnector configured for interconnecting the first and second waveguide flange adapters elements without requiring electrical contact and with assuring that the gap is present, hence assuring that the first surface is not in direct mechanical contact with the second surface;
- wherein the second gap is smaller than λ/4, where λ is a wavelength in a medium surrounding the protruding elements pins of a waveguide signal to be measured, and
- wherein the interconnector comprises a rim, a ridge, a protective element or layer, or a supportive element or layer that at least partly surrounds surfaces formed by the periodically or quasi-periodically arranged protruding elements.

Advantageous embodiments are given by the respective appended dependent claims.

BRIEF DESCRIPTION OF THE DRAWINGS

The invention will in the following be further described in a non-limiting manner, and with reference to the accompanying detailed descriptions of the drawings and throughout the detailed description, where like features throughout the detailed description of the drawings are denoted by the same reference numbers and in which.

DETAILED DESCRIPTION OF THE INVENTION

Figure 1:
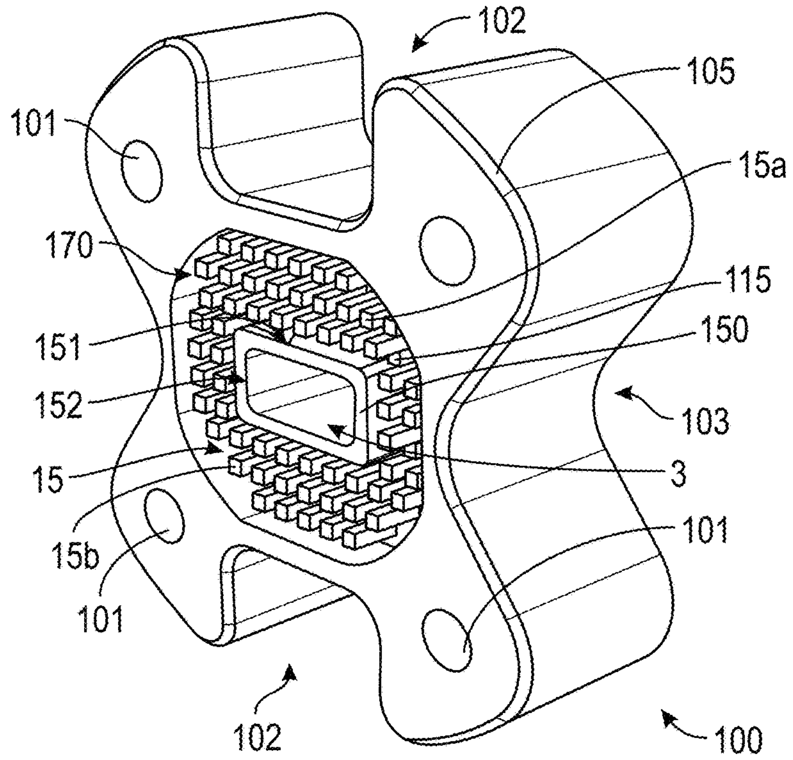
FIG. 1 is a view of an arrangement for interconnection of waveguide structures comprising a flange adapter element according to a first embodiment of the present invention.

FIG. 1 shows a first embodiment of a waveguide structure interconnecting arrangement 100 according to the invention. The waveguide structure interconnecting arrangement 100 here comprises a flange adapter element adapted to be disposed between two waveguide flanges, a first waveguide flange 10 (FIG. 3A) connected to a first waveguide 1, and a second waveguide flange 20 connected to a second waveguide 2 (see, for example, FIG. 3A). The flange adapter element 100 comprises a waveguide flange element with a textured surface 15 (also denoted as a periodic or quasi-periodic structure **15*b*) here comprising a number of protruding elements 15*a*, for example, pins 115, arranged on a conductive surface to form the periodic or quasi-periodic structure 15*b* on one side of the flange adapter element 100. The periodic or quasi-periodic structure 15*b* is arranged to surround a rectangular waveguide opening 3, of a through waveguide in the flange adapter element, on the cross-sectional sides of which metal rim sections or frame surfaces, also called "ridges" 150, are provided such that two long metal rim or ridge sections 151 are provided on the respective long, wide, sides of the waveguide opening 3 and two shorter rim or ridge sections 152 are provided on the short or narrow sides of the waveguide opening 3. The height of the rim or ridge sections 151 is here substantially the same as the height of the protruding elements 15*a* of the periodic or quasi-periodic structure 15*b*. The longer rim or ridge sections 151 may, for example, have a width of about $\lambda/4$, $\lambda$ being the wavelength in the waveguide structure (not shown to scale in FIG. 1, etc.), or, for example, about 400 μm, and serve the purpose of, together with an opposite smooth waveguide flange with which the flange adapter element 100 is to be interconnected, form an impedance transformer which transforms an open circuit to a short circuit to avoid leakage and reflections which may be created at the interface between the flange adapter element and the waveguide flange to which the flange adapter element 100 is to be connected (see waveguide flange 20 in FIG. 3**A).

The flange adapter element 100 is adapted to provide an interconnection between two waveguide structures or components, for example, also antennas, filters, receivers etc., 10, 20 with conventional smooth waveguide flanges (see FIGS. 2 and 3A) as will further described below. The smooth surface surrounding the waveguide opening in the first waveguide flange 10 is shown in FIG. 3A. A protective or supporting element, for example, an outer rim 105, is disposed such as to surround the periodic or quasiperiodic structure 15*b*, i.e. the textured surface 15. The purpose of such a protective or supporting element 105 is to act as a protective distance element assuring that, when interconnecting or fastening elements press the textured surface 15 against a waveguide flange with which the waveguide flange is to be interconnected, the pressure will be exerted on the protective or supporting element 105, and the protruding elements 15*a* of the periodic or quasi-periodic structure 15*b* will be protected. Further, since the protective or supporting element 105 is arranged to protrude a slight distance beyond the outer ends of the protruding elements 15*a*, the presence of a gap will be assured, and the textured surface 15 is prevented from coming into direct mechanical contact with the opposing waveguide flange when interconnected, which might lead to the textured surface 15 and/or the smooth surface of the interconnecting waveguide flange being damaged or ruined. The flange adapter element 100 comprises a number of alignment pin receiving holes 101; in the shown embodiment four, each disposed on a respective wing or flange section protruding from a central section 170 of the flange adapter element 100 where the textured surface 15 is located, in directions perpendicular to the direction of extension of the protruding elements 15*a*. The alignment pin receiving holes 101 serve the purpose of being adapted for receiving alignment pins 111 (for example, FIG. 3A) of waveguide flanges which are to be connected to the flange adapter element 100 such as to assure that the waveguide flanges and the flange adapter element are appropriately aligned, and hence the waveguide flanges 10, 20 which are to be interconnected via the flange adapter element 100. Particularly the flange adapter element can slide on the alignment pins 111.

Between two respective, opposite, pairs of protruding wing or flange sections, two through recesses, here comprising waists, 103 are formed by flange adapter element side walls, perpendicular to the textured surface 15, and tapering towards a central region outside the textured surface 15 on respective sides thereof disposed outside the waveguide short walls 152. Between two respective, opposite, pairs of protruding wing or flange sections two through recesses 102 are formed by flange adapter side walls, which are perpendicular to the textured surface 15. The recesses 102 are here substantially U-shaped with a substantially straight section interconnecting the legs of the U's and located outside the textured surface 15 at locations extending substantially in parallel with the long sides of the waveguide opening 3. The waist shaped recesses 103 and the U-shaped recesses 102 are so shaped, and have such dimensions, as to allow an interconnecting element 12 (for example, FIG. 2) to be located therein, for example, connected to the surface of a respective waveguide flange 10, 20, for example, a standard waveguide flange, whereas the circumferential outer side walls of the wing or flange sections of the flange adapter element 100 are so shaped and have such dimensions as to correspond to the circumferential, peripheral, side walls of the respective waveguide flanges. The positions of the waists and U-shaped recesses are preferably so chosen that the positions correspond to locations where fastening screw holes are located in standard waveguide flanges.

The flange adapter element 100 preferably comprises a solid part made of brass, Cu, Al or any other appropriate material with a good conductivity, a low resistivity and an appropriate density. The flange adapter element 100 may, for example, be plated with Au or Ag in environments where further corrosion protection is needed. It should be clear that also other materials can be used, for example, any appropriate alloy. The flange adapter element 100 can also be fabricated from a suitable plastic/polymer compound and plated with, for example, Cu, Au or Ag.

The flange adapter element 100 in the shown embodiment comprises a flange element on a central portion of which a periodical or quasi-periodic structure 15*b*, also denoted as a textured surface 15, is disposed around the opening of a standard rectangular waveguide 3. It should be clear that in alternative embodiments the flange adapter element may have any other appropriate shape, allowing the flange adapter element to be connected between, for example, two waveguide flanges, a waveguide flange and an antenna or another device, a waveguide flange of a calibrating arrangement, a DUT (Device Under Test) etc. The flange adapter element 100 may in different embodiments be provided as a separate flange adapter element, in other embodiments the flange adapter element 100 may be adapted to be fixedly connected to a waveguide flange (for example, FIG. 5A), or in still other embodiments be adapted to be connected to another flange adapter element (for example, FIG. 6A). The flange adapter element 100 may also form a waveguide flange.

The textured surface 15, for example the periodic or quasi-periodic structure 15*b* may comprise a structure comprising a plurality of protruding elements 15*a*, for example, pins 115 having a square shaped cross-section, but the protruding elements can also have other cross-sectional shapes such as circular or rectangular, comprise a corrugated structure, for example, comprising elliptically disposed grooves and ridges as shown in FIGS. 8A, 8B, 9A and 9B. Other alternative shapes for corrugations are also possible.

Through providing a connection between a conductive smooth flange surface or plane of a waveguide 20 (see FIG. 3A) on one side and a flange surface with a periodic or quasi-periodic structure 15*b* on the other side, the two waveguides (for example, a waveguide and a waveguide of an object to be measured or a waveguide of a calibration standard, a waveguide calibration standard and a VNA waveguide port etc.) can be connected without requiring electrical contact, but also without direct mechanical contact. The presence of a gap 30B (see FIG. 7D), for example, of air, or a gap filled with gas, vacuum, or at least partly with a dielectric material, between the two connecting flange surfaces is allowed since the periodic or quasi-periodic structure stops all kind of wave propagation between the two flange surfaces in all other directions than desired waveguiding paths. The periodic or quasi-periodic structure 15*b*, or textured surface 15, is, as also referred to above, so designed that the periodic or quasi-periodic structure structure 15*b* stops propagation of waves inside the gap 30B in any direction, whereas waves are allowed to pass across the gap from the waveguide opening in one flange surface to the waveguide opening in the other, at least in the intended frequency band of operation. Thus, the shapes and dimensions and the arrangement of, for example, pins, posts, grooves, ridges etc. of the periodic or quasi-periodic structure 15*b* are selected such as to prevent propagation of waves in any direction other than the intended direction.

The non-propagating or non-leaking characteristics between two surfaces of which one is provided with a periodic texture (structure), is known from P-S.Kildal, E. Alfonso, A. Valero-Nogueira, E. Rajo-Iglesias, "Local meta-material-based waveguides in gaps between parallel metal plates", IEEE Antennas and Wireless Propagation letters (AWPL), Volume 8, pp. 84-87, 2009 and several later publications by these authors. The non-propagating characteristic appears within a specific frequency band, referred to as a stopband. Therefore, the periodic texture and gap size must be designed to give a stopband that covers with the operating frequency band of the standard waveguide being considered in the calibration kit. It is also known that such stopbands can be provided by other types of periodic structures, as described in E. Rajo-Iglesias, P-S.Kildal, "Numerical studies of bandwidth of parallel plate cut-off realized by bed of nails, corrugations and mushroom-type EBG for use in gap waveguides", IET Microwaves, Antennas & Propagation, Vol. 5, No $3_A$ pp. 282-289, March 2011. These stopband characteristics are also used to form so called "gap waveguides" as described in Per-Simon Kildal, "Waveguides and transmission lines in gaps between parallel conducting surfaces", patent application No. PCT/EP2009/057743, 22 Jun. 2009.

It must be emphasized that any of the periodic or quasi-periodic textures previously used or that will be used in gap waveguides also can be used in a waveguide structure interconnecting arrangement, a flange adapter element or flange structure of the present invention, and is covered by the patent claims.

The concept of using a periodic texture to improve waveguide flanges is known from P-S.Kildal, "Contactless flanges and shielded probes", European patent application EP 12168106.8, 15 May 2012.

According to the present invention, the two surfaces, for example, the textured structure of the flange adapter element or a flange element, i.e. the plane formed by the free outer ends of the pins or ridges or similar of a periodic or quasiperiodic structure, and a smooth waveguide flange, or another textured surface, must not be separated more than a quarter of a wavelength of a transmitted signal, or rather have to be separated less than a quarter wavelength. This is thoroughly described in the above-mentioned publications, such as in particular in E. Rajo-Iglesias, P.-S. Kildal, "Numerical studies of bandwidth of parallel plate cut-off realized by bed of nails, corrugations and mushroom-type EBG for use in gap waveguides", IET Microwaves, Antennas & Propagation, Vol. 5, No 3, pp. 282-289, March 2011.

The periodic or quasi-periodic structure 15*b* in particular embodiments comprises an array of pins 115 with a cross section, for example, having the dimensions of 0.15λ×0.15λ and a height of 0.15λ-0.25λ.

An interface formed by a smooth conductive surface of a waveguide flange 20 on one side of the interface and a textured surface 15 on the other side of the interface prevents power from leaking through the gap between the smooth conductive surface and the textured surface 15, or between two textured surfaces 15 (see in particular embodiments described with reference to FIGS. 6A, 6B, 6C, 7A, 7C and 7D). Propagation in non-desired directions is prohibited by means of a high impedance, resulting from the provisioning and arrangement of a periodic or quasi-periodic structure.

According to the invention, by using a combination of a surface comprising a periodic or quasi-periodic structure 15*b* and a waveguide flange 20B with a smooth conductive surface, or two surfaces each provided with a periodic structure (see, for example, FIGS. 7A-7D as discussed above) waveguides can hence be connected also without the surfaces having to be in electrical contact, and through the use of a protective or supportive rim 105 also no direct mechanical or physical contact is required which in turn relieves the requirement of a tight fastening by means of screws or similar to interconnect the surfaces, and the flange surfaces are protected.

Particularly the texture is designed to provide a stopband for waves leaking out between the two joining flanges, even when there is a small gap between the textured flange surface and the opposite flange surface, and also so that waves passing from the waveguide opening in one flange to the waveguide opening in the joining flange are not affected so that the transmission signal and the reflection signal from the joint is very close to the transmission and the reflection when conventional waveguide flanges are joined together, interconnected, tightly by screws which are drawn tight. As also referred to above, the texture can be made by pins, ridges or grooves etc. disposed around the waveguide opening in a pattern which is optimized to provide a good performance in terms of a low leakage, and improving, enhancing, the transmission coefficient which is reduced due to there being a discontinuity caused by the small gap between the two joining waveguides, and reducing the reflection coefficient which is increased due to there being a discontinuity caused by the small gap between the two joining waveguides.

PCT application PCT/SE2016/050277 with priority from Swedish patent application 1550412-9, filed on 4 Apr. 2015 by the same Applicant as for the present application, and the content of which herewith is incorporated herein by reference, shows an arrangement for connecting an analyzing or measuring instrument to a waveguide calibration standard or a device under test, and a calibration arrangement for a tool or instrument for analyzing or measuring microwave circuits or devices. The tool or instrument comprises a calibration connector element in the form of a disk or plate with a waveguide opening in the disk or plate to be located between two joining waveguide flanges, allowing contactless connection between the two waveguide flanges, one of which being the port of the analyzing or measuring instrument, for example, a Vector Network Analyzer (VNA), and the other being the port of either a waveguide calibration standard or a device under test. The calibration connector element comprises two surfaces, one on each side of the calibration connector element, each of which has a periodic or quasi-periodic structure around the waveguide opening forming a first and a second periodic or quasi-periodic structure. The calibration connector element is connectable between the waveguide flanges in such a way that on each side of the calibration connector element a gap is formed between the periodic or quasi-periodic structure and the smooth surface of the corresponding flange, hence allowing interchangeable contactless interconnection of a waveguide of the analyzing or measuring instrument, for example, a VNA, and a waveguide calibration standard or a device under test comprising a waveguide port.

Figure 2:
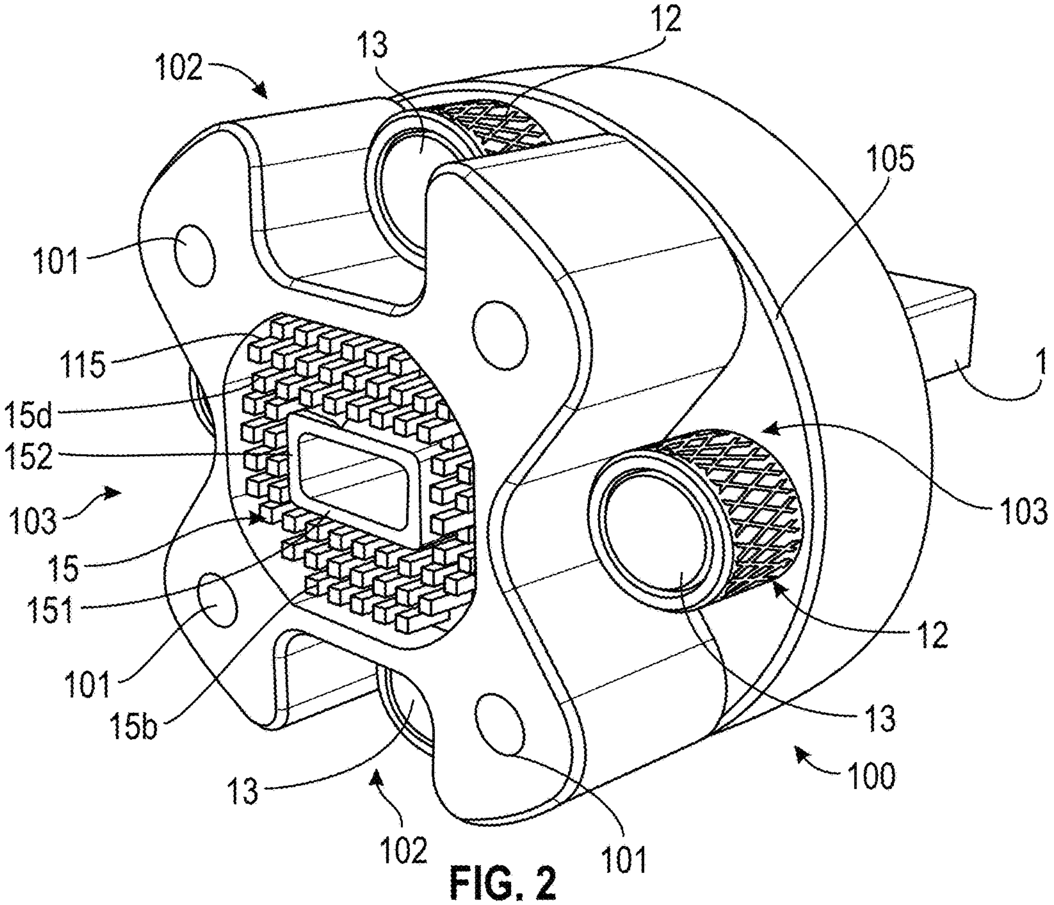
FIG. 2 shows the flange adapter element of FIG. 1 as connected to a waveguide flange.
Figure 3A:
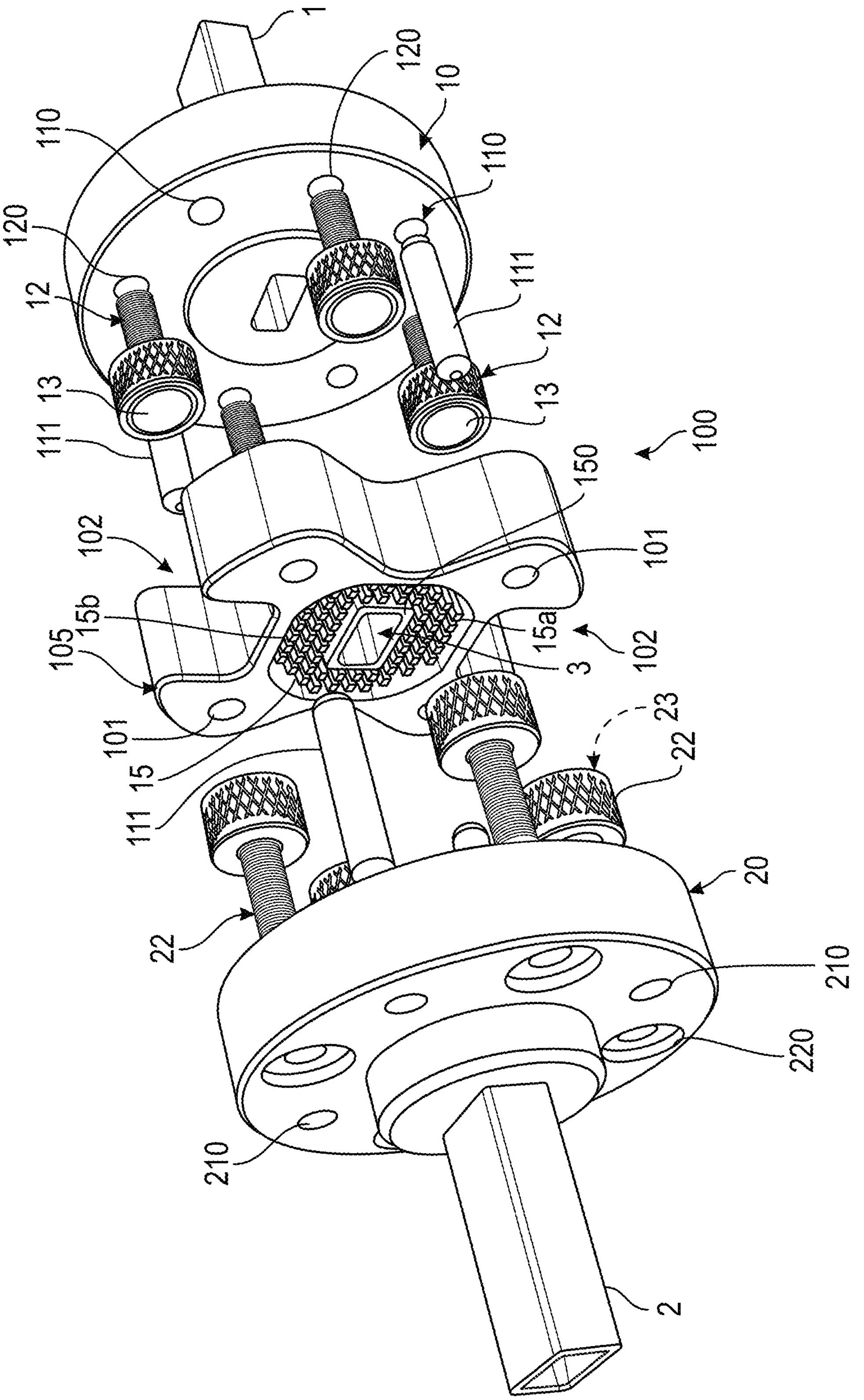
FIG. 3A shows the flange adapter element of FIG. 1 arranged in a position between, and for interconnecting, two waveguide flanges.

FIG. 2 shows the flange adapter element 100 of FIG. 1 connected to a waveguide flange 10 FIG. 3A of a first waveguide structure 1. The waveguide flange 10 is here supposed to be a standard waveguide flange, for example, a V-band flange, a WR15 flange, or any other standard waveguide flange. Such a standard waveguide flange 10 normally comprises four alignment pin holes 110, not visible in FIG. 2; compare FIG. 3A, for reception of alignment pins 111, and four screw holes 120 adapted for reception of fastening screws. According to the present invention the flange adapter element 100 is releasably connected to the standard waveguide flange 10 and aligned, and can slide, with respect thereto by means of two alignment pins 111 introduced into two respective, oppositely disposed, alignment pin holes 110 of the standard waveguide flange 10 and the corresponding alignment pin holes 101 in the wing sections of the flange adapter element 100. Interconnecting elements in the form of screws 12 with heads having magnets 13, in the following also simply denoted magnetic screw heads, or magnetic elements on the screw heads, are introduced into the screw holes 120 of the standard waveguide flange 10, and the through recesses, waists 103 and U-shaped recesses 102, of flange adapter element 100 are so located and have such sizes as to allow reception of the screw heads 13. The height of the head of each screw 12 substantially corresponds to half the thickness of the flange adapter element 100. In some embodiments the magnetic elements comprise small elements fastened to the flat surface of the screw heads, for example, by means of gluing or in any other appropriate manner as also will be further discussed below. The screw heads 13 may also comprise magnetic head portions. Elements shown in FIG. 2 which already have been described with reference to FIG. 1 will not be further discussed with reference to FIG. 2.

FIG. 3A illustrates two waveguide structures 1, 2, comprising two standard waveguide flanges 10, 20 in a position for being interconnected by means of a flange adapter element 100 as described with reference to FIGS. 1 and 2. The flange adapter element 100 and the first standard waveguide flange 10 have already been described with reference to FIGS. 1 and 2 and will therefore not be further described herein. The second standard waveguide flange 20 is in the shown embodiment similar to the first standard waveguide flange 10 and comprises four alignment pin holes 210 and four fastening element or screw holes 220. Two alignment pins 111 are in a positions for being introduced into two corresponding alignment pin holes 101 and 110 of the first standard waveguide flange 10 and the flange adapter element 100 respectively. The respective pin holes that are used for alignment of the flange 10 and the flange adapter element 100 are oppositely disposed, and the remaining two alignment pin holes 101 of the flange adapter element 100 are used for reception of two further alignment pins 111 which in the other ends are intended to be received in corresponding alignment pin holes 210 of the second waveguide flange 20. Four screws 12 with magnetic heads 13 are in a position for being introduced into four screw holes 120 of the first waveguide flange 10, and four other screws 22 with magnetic heads 23 are in a position for being introduced into four screw holes 220 of the second waveguide flange 20. The screws 12, 22 with the magnetic heads 13, 23 are so disposed that interconnection can be achieved by means of a snap-on like operation, clamping the flange adapter element 100 between the first and the second waveguide flanges 10, 20. It is an advantage that the flange adapter element 100 can slide on the alignment pins 111 that the joining flanges are movable in relation to each other through the gap and in particular embodiments need not be centralized with respect to the stop band. In one embodiment the magnetic elements 13, 23 comprise neodymium magnets, (NdFeB) which are strong permanent magnets. Of course also other magnetic materials with similar properties may be used, this is merely to be seen as an example. The surface may, for example, be Ni-plated or plated with some other appropriate material. In some embodiments the screw heads of conventional screws used for fastening of waveguide flanges are provided with small permanent magnets.

The flange adapter element particularly is solid and made in one piece in order not to influence the signal flow. The flange adapter element may, for example, be made by molding, casting, ablation, material assembling, for example, micro-assembling and cutting is another method.

Figure 3B:
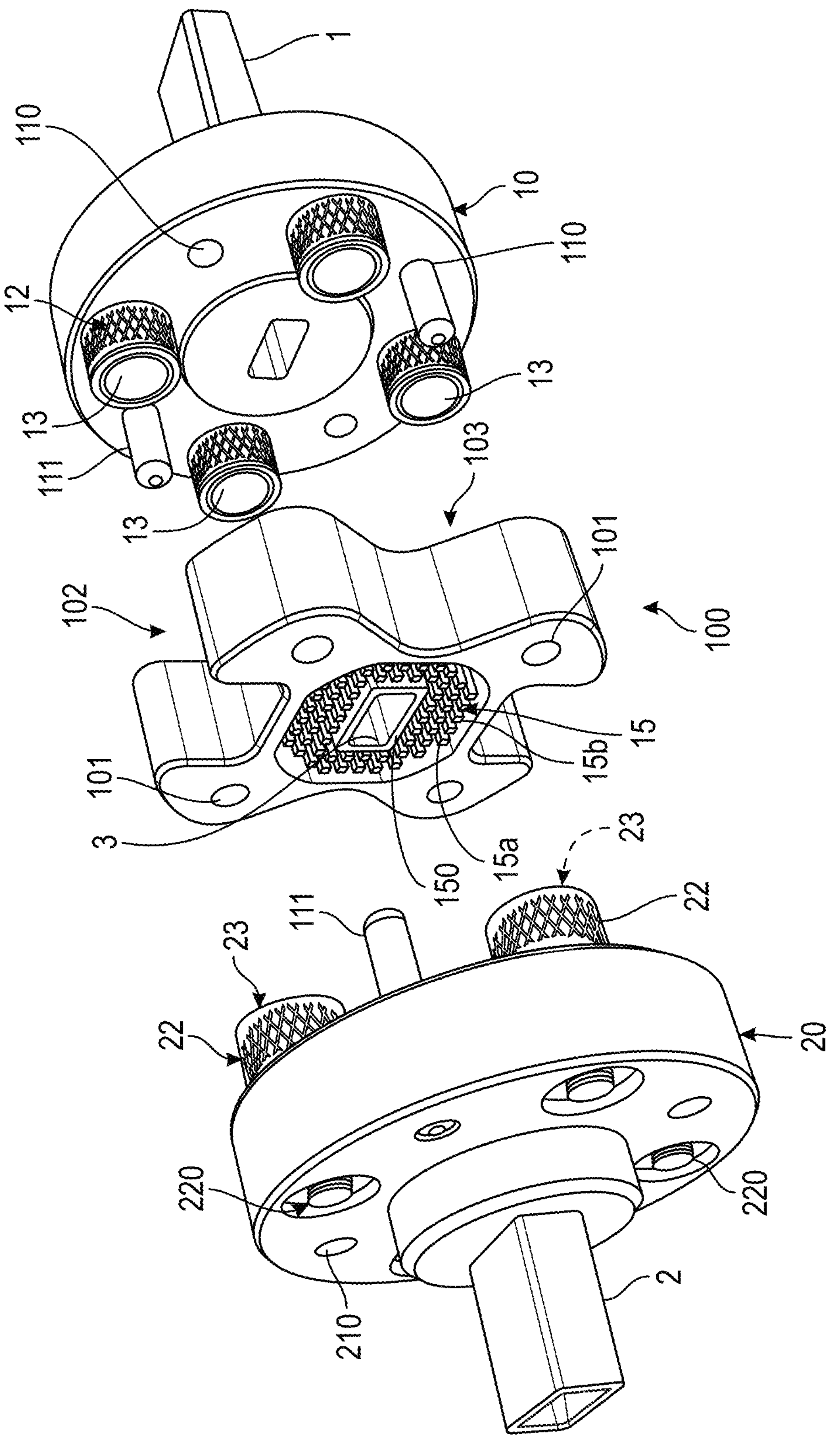
FIG. 3B shows the flange adapter element of FIG. 1 in a position between, and for interconnecting, two waveguide flanges as in FIG. 3A with interconnecting elements comprising screws with magnetic heads screwed into the waveguide flanges.

FIG. 3B illustrates the two waveguide structures 1, 2, comprising two standard waveguide flanges 10, 20 in a position for being interconnected by means of the flange adapter element 100 as in FIG. 3A, but with the interconnecting elements, screws 12, 22, introduced into the screw holes 120, 220 (FIG. 3A) of the first and second waveguide flanges 10, 20. When the waveguide flanges 10, 20 are brought in contact with the flange adapter element 100, with the screws 12, 22 positioned in the recess sections, i.e. here the U-shaped recesses 102 and the waist sections 103, the waveguide flanges will be forced towards each other and be joined or interconnected by means of the magnetic force between the magnetic screw heads 13, 23. Due to the alignment pins 111, the positioning will be accurate. Thus, interconnection takes place in an easy manner, like a snap-on operation. Although screws are still needed, they can, for example, easily be applied or introduced into the screw holes of the waveguide flanges 10, 20 on beforehand. There is also no need to tighten any screws. Once the screws have been applied to the waveguide flanges, and these screws are brought in position on opposite sides of a flange adapter element 100, the interconnection will take place in an almost automatic manner without requiring any particular skill of the personnel handling the assembly. Accordingly, interconnection (joining), removal, replacement of waveguide structures, or waveguide flanges, is considerably facilitated and can be done in an easy and fast manner, with a high accuracy and without needing to exert strong forces resulting in the risk of ruining the textured surface, or the smooth surface of the opposing flange.

Figure 3C:
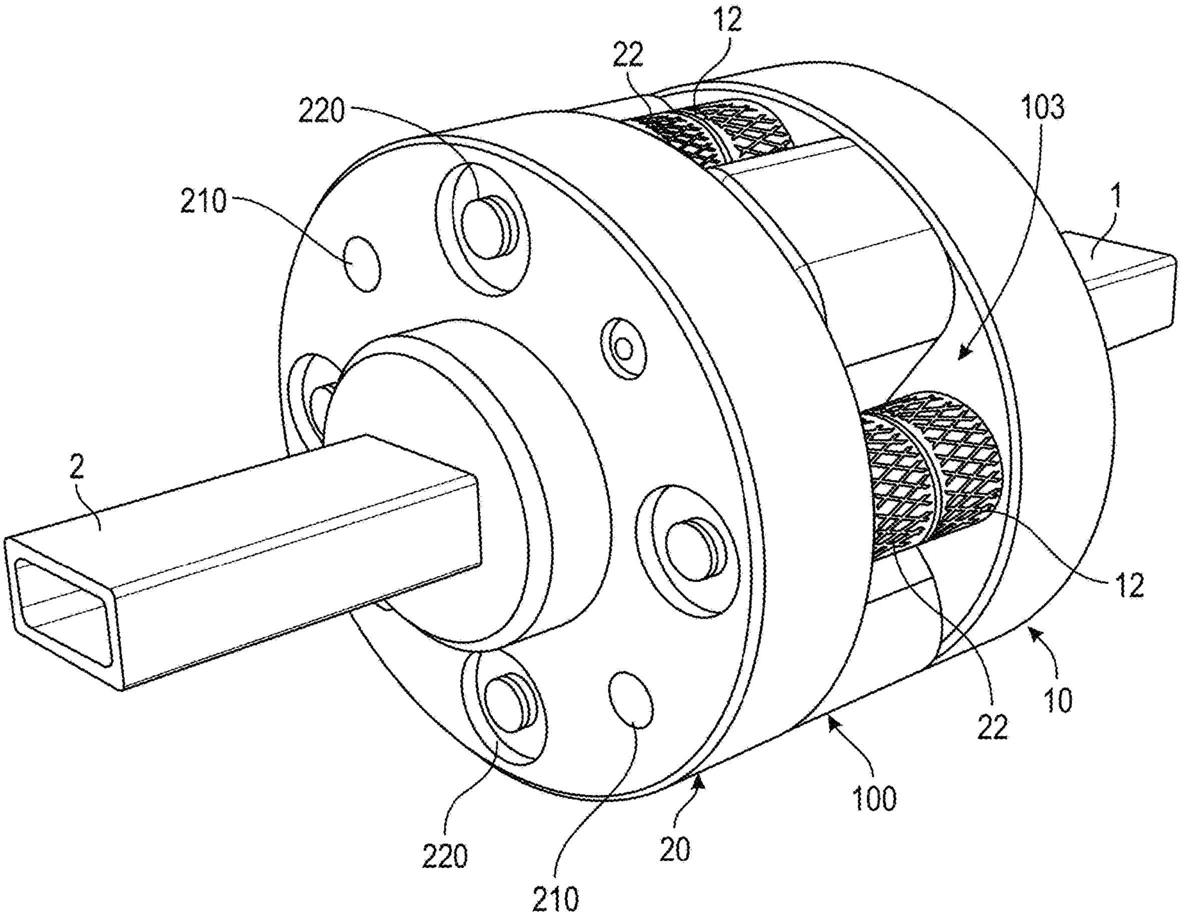
FIG. 3C shows the flange adapter element of FIG. 1 disposed between, and interconnecting, two waveguide flanges, i.e. in a state in which the waveguide structures are interconnected.

In FIG. 3C a state in which the first and second waveguide flanges 10, 20 are interconnected or joined by means of interposition of the flange adapter element 100 and held together by means of the magnetic heads 13, 23 (shown in FIGS. 3A and 3B) of the interconnecting screws 12, 22, and aligned by means of the alignment pins 111 (FIG. 3B) as discussed above. The slight gap between the periodic or quasi-periodic structure 15*b* (shown in FIGS. 3A and 3B) and the smooth surface of the second waveguide flange 20 cannot be seen in FIG. 3C due to the presence of the protective or supporting element 105 (see FIG. 1) which is in contact with the smooth surface of the second waveguide flange 20.

Figure 4:
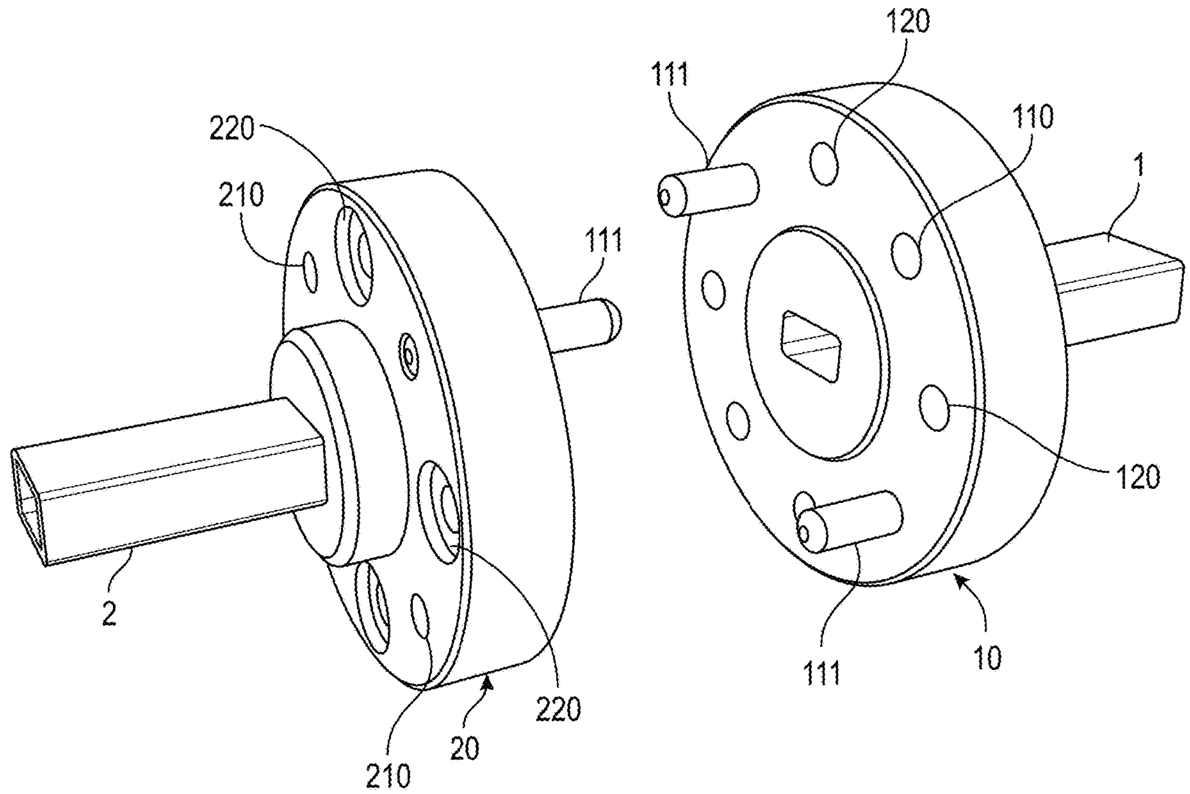
FIG. 4 is a view in perspective of two waveguide flanges, each with two alignment pins and screw holes for interconnecting elements.

FIG. 4 shows a schematic view in perspective serving the purpose of illustrating the first and second waveguide flanges 10, 20, each with two alignment pins 111 introduced into two respective alignment pin holes 110, 210. As can be seen two diametrically disposed alignment pin holes of each waveguide flange are used, and alignment pin holes with different positions are used in the first and second waveguide flanges 10, 20, such that, when interconnected by means of flange adapter element, all four holes of the flange adapter element 100, whereas only two each of the alignment pin holes of the waveguide flanges 10, 20 are used. In other respects the elements shown in FIG. 4 have already been discussed with reference to the preceding figures.

Figure 5A:
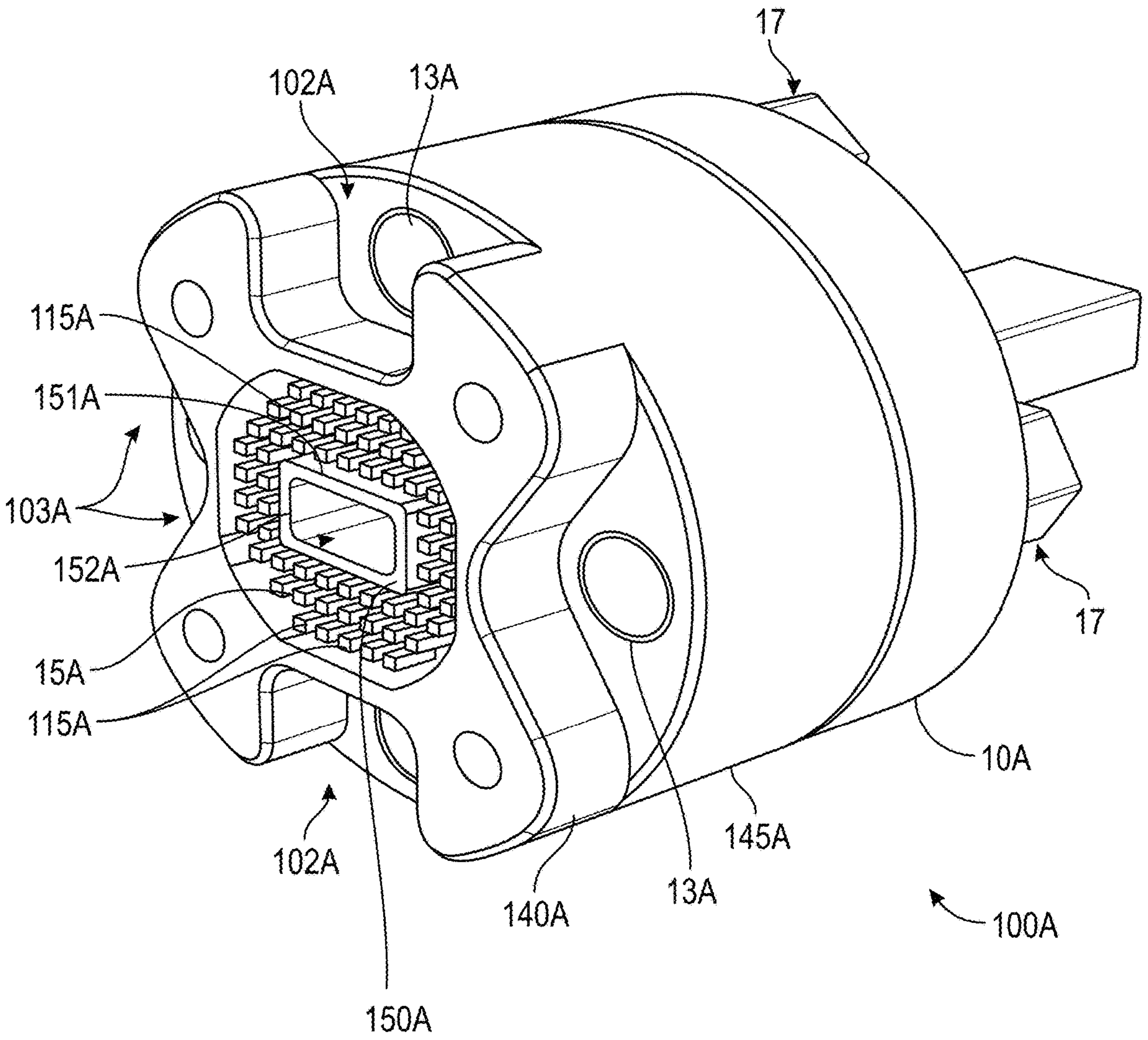
FIG. 5A shows an alternative embodiment of a flange adapter element adapted to be fixedly connected to a waveguide flange, and the waveguide flange to which the flange adapter element is connected.

FIG. 5A shows an alternative embodiment of a waveguide structure interconnecting arrangement which here comprises a flange adapter element structure 100A adapted to be fixedly or releasably connected to a waveguide flange 10A, for example, a standard waveguide flange 10A. The flange adapter element structure 100A is fastened to the waveguide flange 10A by means of fastening screws 17 introduced into the waveguide flange 10A in a direction towards the wave-guide flange adapter element structure 100A. The flange adapter element structure 100A comprises a waveguide adapter element main body 140A substantially as described with reference to FIGS. 1, 2, 3A, 3B, 3D, and 4, but which is integral with, or made in one piece with, or connected to, a flange adapter support element 145A preferably with the same cross section as the first waveguide flange 10A and having a thickness allowing the first waveguide flange 10A to be fixedly (or removably) connected thereto by means in the conventional art of fastening screws 17. Alternatively, the flange adapter element structure 100A can be connected to the waveguide flange 10A in any other appropriate manner, the flange adapter element structure 100A might even be glued onto the waveguide flange 10A in some alternative embodiment. In the through recess section 102A and waist 103A (here similar to the corresponding sections 102, 103 described with reference to FIGS. 1 and 3A) and on a surface of the flange adapter support element 145A on which the part of the flange adapter element structure 100A is provided which correspond to the flange adapter element, for example, as described with reference to FIG. 1, magnetic elements 13A are provided. In the shown embodiment the magnetic elements 13A are fixedly mounted in recesses designed therefore in the flange adapter support element 145A such as to not protrude from the outer surface of flange adapter support element 145A, i.e. contiguous therewith. For interconnection to a second waveguide flange (see FIG. 5B) as described with reference to FIGS. 3A-3D, either screws with magnetic heads as in an embodiment described with reference to FIGS. 3A-3D would have to have heads with a thickness of approximately twice the thickness in order to allow interconnection, or the flange adapter element main body 140A would have to have a thickness of about half the thickness of the flange adapter element 100 in FIG. 1, the flange adapter main body 140A being thinner. In still other embodiments (not shown) the magnetic elements 13A are disposed such as to be located at about half the height of the flange adapter element main body 140A, for example, disposed on shoulders or similar on the surface of the flange adapter support element 145A. Still further the magnetic elements may have a height substantially corresponding to a magnetic screw head as described above or comprise a magnetic surface provided on mounting elements having substantially such a height. Many variations are possible. As described in reference to FIGS. 5A and 5B, the flange adapter element 100A comprises a waveguide flange element with a textured surface 15A, such as pins 115A (FIG. 5A). Furthermore, the metal rim or ridge sections 151A, 152A are provided which form a rim or ridge 150A (FIG. 5A).

Figure 5B:
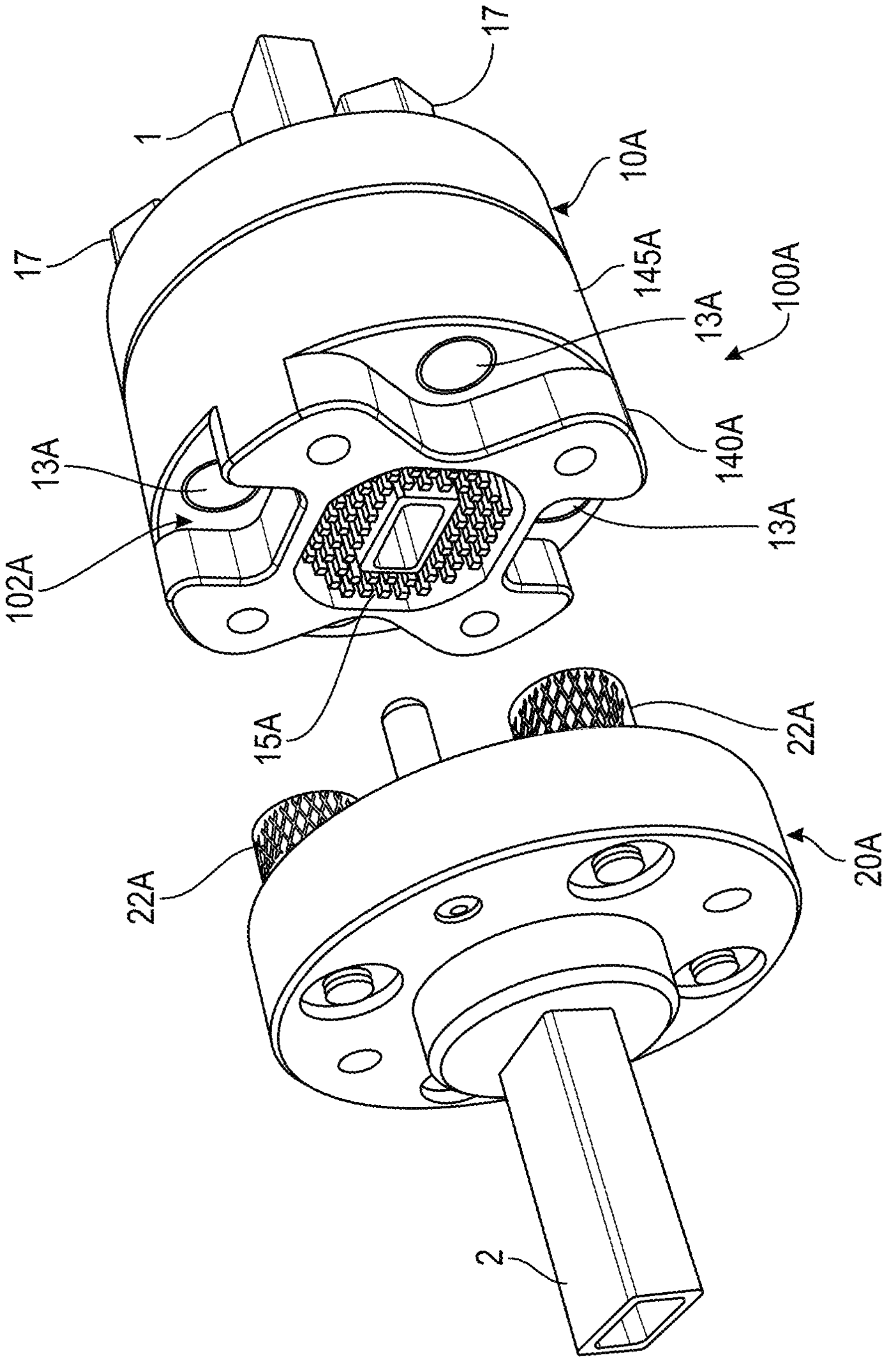
FIG. 5B shows the flange adapter element connected to a waveguide flange of FIG. 5A in a position for interconnection with another waveguide flange.

FIG. 5B illustrates the flange adapter element structure 100A of FIG. 5A as mounted on a first waveguide flange 10A in a position for being interconnected with a second waveguide flange 20A with a smooth surface as described with reference to FIGS. 3A, 3B, 3C and 3D. Since the functioning as far as the interconnection or joining to a second waveguide flange 20A corresponds to that described with reference to FIGS. 3A, 3B, 3C, and 3D, this will not be further described herein.

It is an advantage that, allowing a flange adapter to be fastened, for example, by screws 22A, to a waveguide flange, the flange adapter will be kept in place, there is no risk of losing the flange adapter, and the flange adapter will not fall off.

Figure 6A:
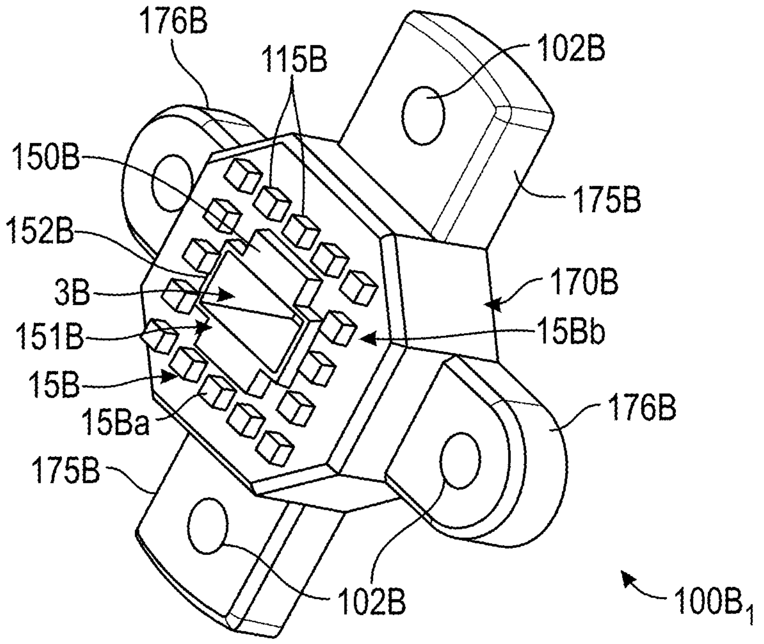
FIG. 6A is a view in perspective of another embodiment of a flange adapter element which comprises protruding elements having a height corresponding to half the height of a total texture in a gap structure.
Figure 6B:
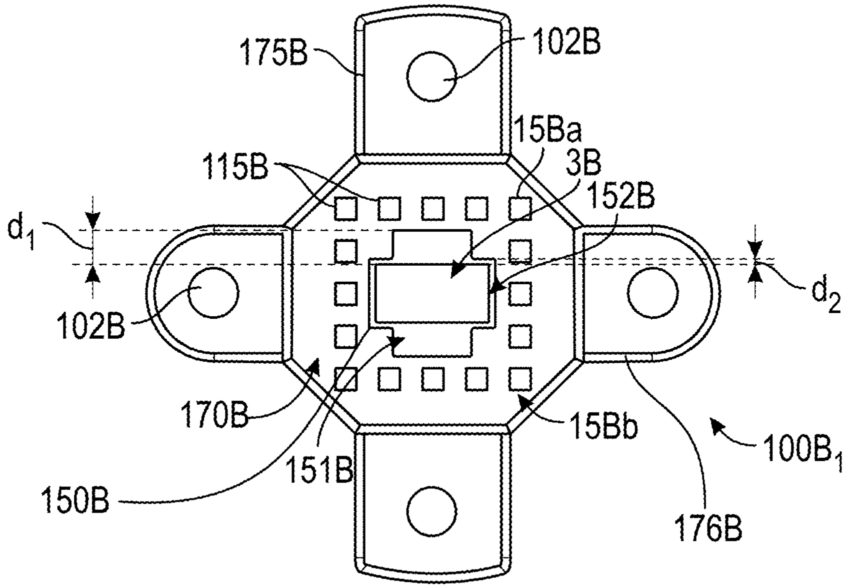
FIG. 6B is a top (also called "front") view of the flange adapter element shown in FIG. 6A.
Figure 6C:
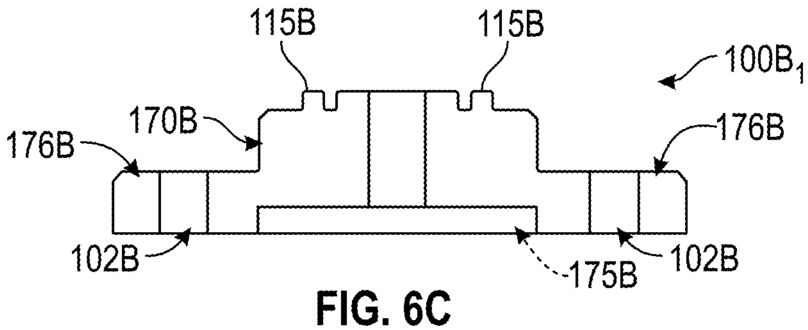
FIG. 6C is a side view of the flange adapter element in FIG. 6A.
Figure 7A:
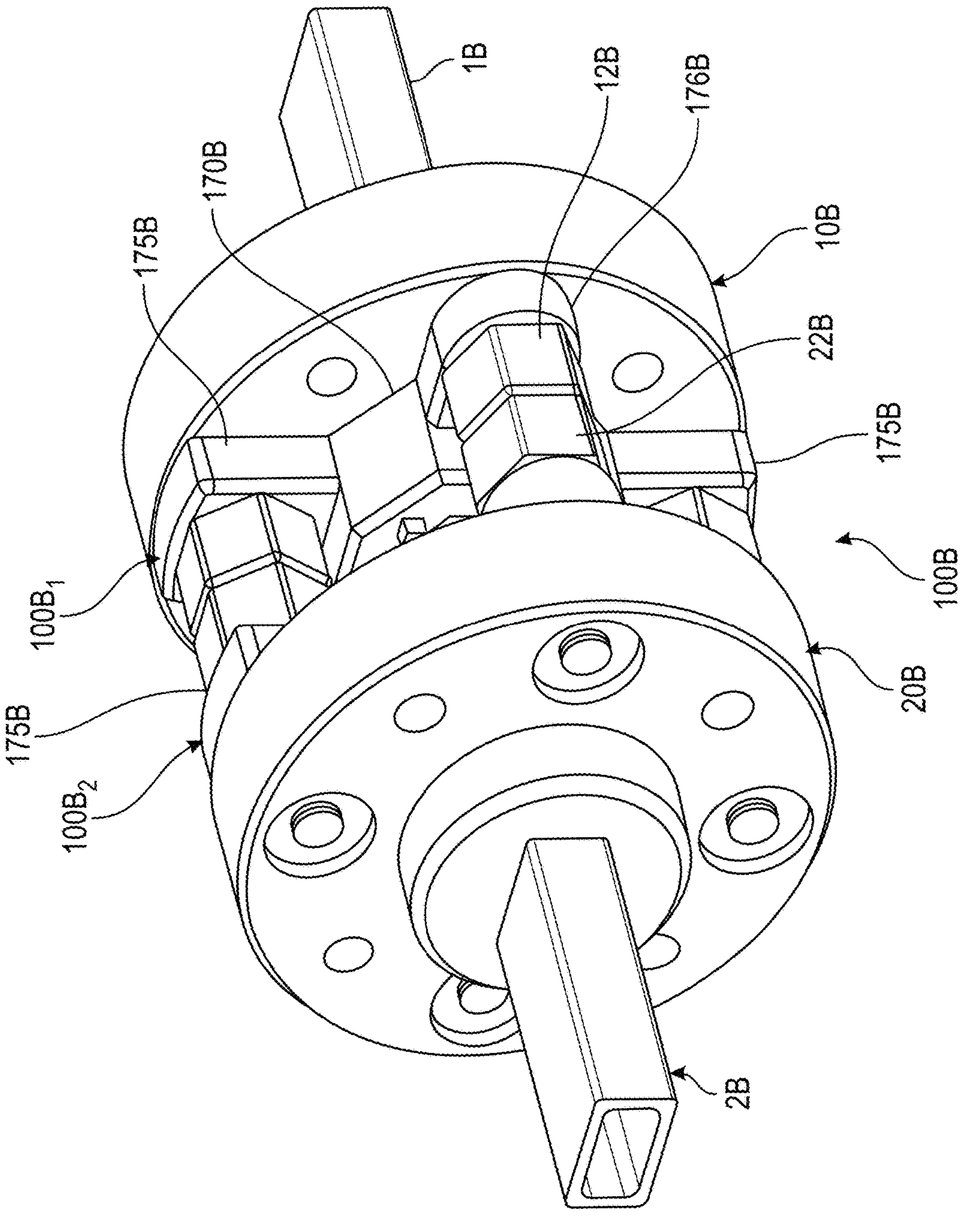
FIG. 7A is a view in perspective of an interconnecting arrangement comprising two flange adapter elements provided with a periodic or quasi-periodic structure as in FIG. 6A interconnecting two waveguide flanges.

In the embodiments shown in FIGS. 6A, 6B, 6C, 7A, 7B, 7C and 7D, two flange adapter elements 100$B_1$ (FIG. 6A), 100$B_2$ (FIG. 7A) are connected together and referred to as 100B (FIG. 7A). FIGS. 6A, 6B and 6C show different views of the flange adapter element 100$B_1$ and the flange adapter element 100$B_2$ is the same as 100$B_1$. The two flange adapter elements 100$B_1$, 100$B_2$ (FIG. 7A) are adapted to be disposed between, and, fixedly or detachably, connected to each a waveguide flange 101B, 20B as shown in FIG. 7A. The flange adapter element 100$B_1$ comprises a waveguide flange element with a textured surface 15B (FIGS. 6A and 7B), here with a number of protruding elements 15Ba, for example, pins 1151B, arranged on a conductive surface to form a periodic or quasi-periodic structure 15Bb on one side of the flange adapter element 100$B_1$ as described with reference to the preceding embodiments. The periodic or quasi-periodic structure 15Bb (FIGS. 6A and 7B) is arranged to surround a rectangular waveguide opening 3B (FIGS. 6A and 6B) on the sides of which metal rim or ridge sections 151B, 152B 6A and 6B (FIGS. 6A and 6B) are provided which form a rim or ridge 150B (FIGS. 6A and 6B). Two shorter rim or ridge sections 152B (FIGS. 6A and 6B) are provided on the waveguide opening short or narrow sides. On each wide or long side of the waveguide opening 3B a long metal rim or ridge section 151B (FIGS. 6A and 6B) is provided. In the shown embodiment the long rim or ridge section 151B has a first a first wall thickness $d_1$ substantially being λg/4, Ag being the wavelength in the waveguide structure, extending along the central, major, part of the waveguide wide or long side, and a second wall thickness $d_2$ width at the outer ends of the waveguide long side, wherein $d_2$ is smaller than $d_1$ (FIG. 6B). A reason for the different thicknesses is to improve the capability of covering a wide frequency band avoiding resonances within the band, see also FIGS. 11, 12, 13A, 13B, 14A and 14B where the exemplary structure is more thoroughly discussed. In other embodiments, however, a same wall thickness may be used, for example, as shown in FIG. 1, although not to scale in FIG. 1. Other alternatives are also possible.

The height of the frame or rim sections 151B, 152B is substantially the same as the height of the protruding elements 15Ba of the periodic or quasi-periodic structure 15Bb.

The flange adapter element 100$B_1$ is adapted be connectable, fixedly or removably, to a standard waveguide flange 10B (compare FIGS. 7A, 7B) to, allow the flange adapter element 100$B_1$ to be joined or interconnected with a second, similar, flange adapter element 100$B_2$ connectable, fixedly or removably, to, for example, a second standard waveguide flange 20B, hence providing an interconnection between the two waveguide structures 1B, 2B (FIGS. 7A, 7B) with conventional smooth waveguide flanges.

The flange adapter element 100$B_1$ comprises a central portion 170B provided with a periodic or quasi-periodic structure 15Bb comprising a plurality of protruding elements 15Ba, a textured surface, disposed around the opening of a standard rectangular waveguide opening 3B. In this embodiment the pins 115B or protruding elements 15Ba each has a height, or length, corresponding to substantially half the total length of the pin or protruding element required to form the desired stop band. The total height is formed by the two flange adapter elements 100$B_1$, 100$B_2$ disposed such that the textured surfaces 15B face one another, and the total length being formed by two corresponding protruding elements 15Ba, one on each flange adapter element (see FIGS. 7A, 7B).

In still other alternative embodiments different heights are used for the sets of pins or protruding elements or corrugations on flange adapter elements. In yet other embodiments the lengths or heights of the pins or protruding elements, or corrugations, vary within the respective sets (not shown), as long as the total length of one another facing, or oppositely disposed, pins, protruding elements or corrugations corresponds to a length required for the desired stop band. Such different arrangements of protruding elements are disclosed in the European patent application "Waveguide and transmission lines in gaps between parallel conducting surfaces", EP15186666.2, filed on 24 Sep., 2015 by the same Applicant, the content of which herewith is incorporated herein by reference, and which shows a microwave device which comprises two conducting layers arranged with a gap there between, wherein each of the layer comprises a set of complementary protruding elements, arranged in a periodic or quasi-periodic pattern and connected thereto, and which sets in combination for a texture for stopping wave propagation in a frequency band of operation in other directions than along intended waveguiding paths. When the lengths of the protruding elements are the same, and the full length of the texture being formed by two protruding elements arranged on each a conducting layer, the length of a protruding element hence corresponding to half the length of the full-length of the protruding elements of the texture.

Generally, throughout the application, the length of a full-length protruding element 15Ba is approximately between $\lambda/4$ and $\lambda/2$, and the height of a so called "half-length element," is substantially between $\lambda/8$ and $\lambda/4$, $\lambda$ being the wavelength in free space or a dielectric media.

The flange adapter element 100$B_1$ further comprises pairwise oppositely directed wing sections 175B, 176B extending in four directions from the central portion 170B which here has a substantially octagonal cross-sectional shape. Each wing section 175B, 176B is provided with a screw hole 102B adapted to receive an interconnecting screw 12B (FIGS. 7A-7D) with a magnetic head (or screw head with a magnetic element as also discussed above) 13B (see FIG. 7B) for connection to a waveguide flange (FIG. 7A), and, via the magnetic head 13B, releasable interconnection with another magnetic head (or screw head with a magnetic element) 23B (FIG. 7C) of a screw 22B (FIG. 7C) connecting the second, or other, flange adapter element 100$B_2$ to the second waveguide flange 20B (FIG. 7B). The thickness of the wing sections is such that, together with the height of the head of the interconnecting screw 12B (FIG. 7B), the length or the height of the protruding elements 15Ba is slightly exceeded, leaving a slight air gap between one another facing protruding elements 15Ba on the respective flange adapter element 100$B_1$, 100$B_2$.

The air gap is smaller than $\lambda/4$, and the height of the protruding elements 15Ba, here half-length elements, is for example, substantially $\lambda/8$.

FIG. 6B is a top, or front, view of the flange adapter element 100$B_1$ shown in FIG. 1 illustrating the wall thicknesses $d_1$, $d_2$ of the long rim or ridge section 151B.

FIG. 6C is a side view in cross-section of the flange adapter element 100$B_1$ shown in FIG. 1.

In alternative embodiments the opposite pairs of protruding wing or flange sections have shapes as disclosed with reference to FIG. 1, with the difference that the opposite pairs of protruding wing or flange sections have to be thinner for half-height protruding elements, or be adapted depending on the lengths of cooperating protruding elements together forming a full-height protruding element, such as to leave room for magnetic screw heads, while keeping a slight gap between the protruding elements on two for the interconnection cooperating flange adapter elements.

FIG. 7A illustrates two waveguide flanges 10B, 20B interconnected by means of two flange adapter elements 100$B_1$, 100$B_2$ as discussed with reference to FIGS. 6A-6C. Since the different elements and parts have already been discussed above, these elements and parts will not be further discussed with reference to FIG. 7A. The distance between the flange gap adapters, the air gap, may, for example be about 100 μm.

Figure 7B:
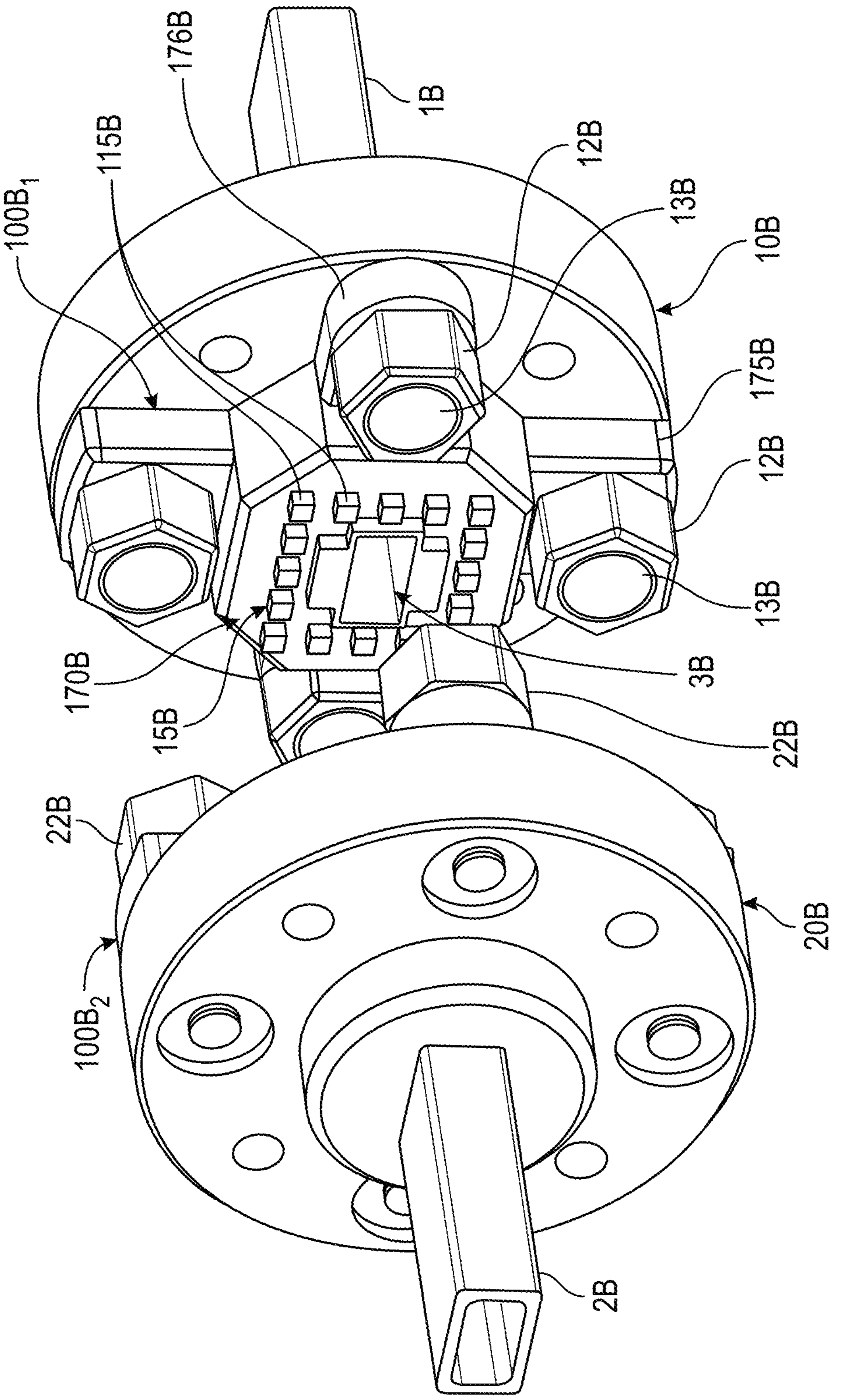
FIG. 7B is a view in perspective as in FIG. 7A, but in a non-interconnected state.
Figure 7C:
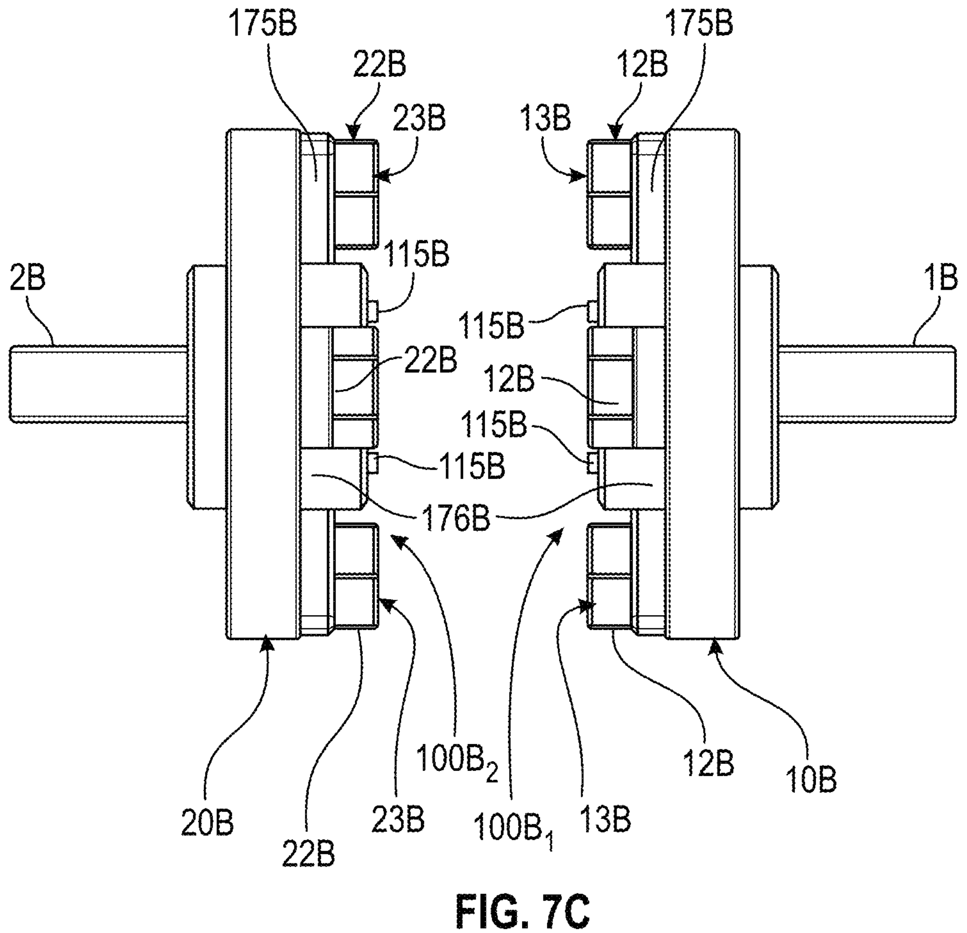
FIG. 7C is side view of the arrangement shown in FIG. 7A in a non-interconnected state.

FIG. 7B is a view in perspective showing the two waveguide flanges 10B, 20B to which each a flange adapter element 1001$B_1$, 100$B_2$ is connected by means of the screws 12B in a position for being interconnected through the magnetic heads 13B, 23B FIG. 7C magnetic elements or portions on the screw heads 12B, 22B as discussed above.

FIG. 7C is a schematic side view showing the two waveguide flanges 10B, 20B to which each a flange adapter element 100$B_1$, 100$B_2$ is connected by means of the screws 12B, 22B in the position for being interconnected through the magnetic attraction between magnetic heads 13B, 23B as shown in FIG. 7B.

Figure 7D:
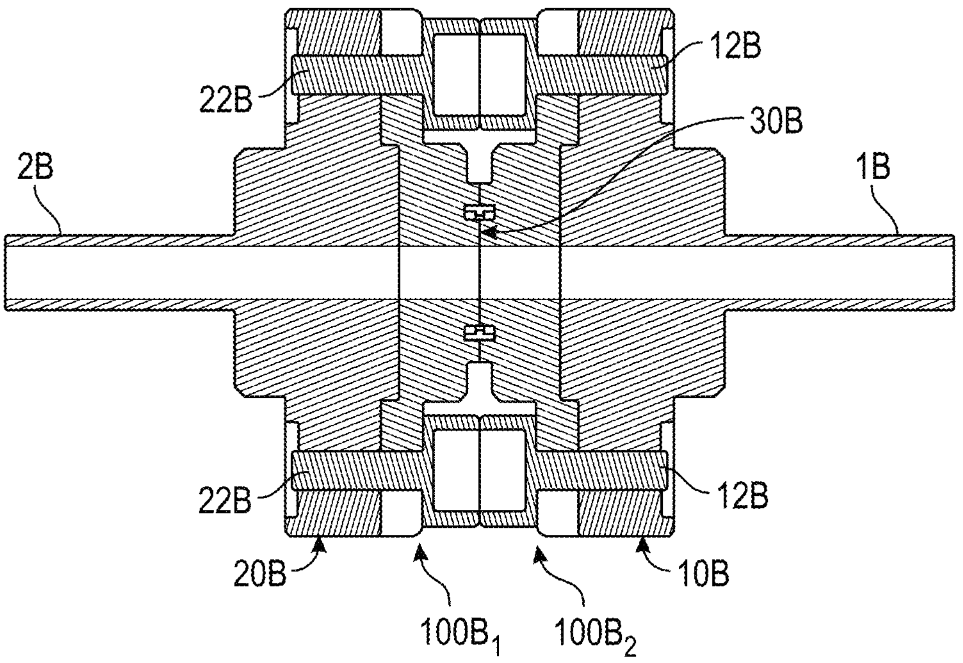
FIG. 7D is a cross-sectional side view of the arrangement shown in FIG. 7A in an interconnected state.

FIG. 7D is a schematic cross-sectional side view showing the two waveguide flanges 10B, 20B to which each a flange adapter element 100$B_1$, 100$B_2$ is connected by means of the screws 12B (FIG. 7C), 22B in an interconnected state as in FIG. 7A illustrating the gap 30B between the periodic or quasi-periodic structures of the flange adapter elements 100$B_1$, 100$B_2$.

A particular advantage with the use of half-height protruding elements is that only one type of flange or flange adapter element is needed instead of two different types involved in an interconnection, as for example in the case of a textured flange adapter element, as a separate element or fixed to, or forming part of, a waveguide flange, or a flange with such a texture, and a waveguide flange with a smooth surface. Thus gender-less flange adapter elements or waveguide flanges can be provided.

It should also be clear that the pattern of the textured surface, of the protruding elements forming the periodic or quasi-periodic structure, can be different, for example as shown with reference to FIG. 1, or the structure of the embodiment in FIG. 1 may be as shown in FIG. 6A, etc. Any variation is possible, and will be further discussed with reference to FIGS. 10A, 10B, 11, 12, 13A, 13B, 14A and 14B below.

The flange adapter element 100B preferably comprises a solid part made of brass, Cu, Al or any other appropriate material with a good conductivity, a low resistivity and an appropriate density. The flange adapter element 100B may, for example, be plated with, for example Au or Ag, in environments where further corrosion protection is needed. It should be clear that also other materials can be used, for example, any appropriate alloy, or a plastic/polymer compound plated with, for example, Cu, Au or Ag.

Figure 8A:
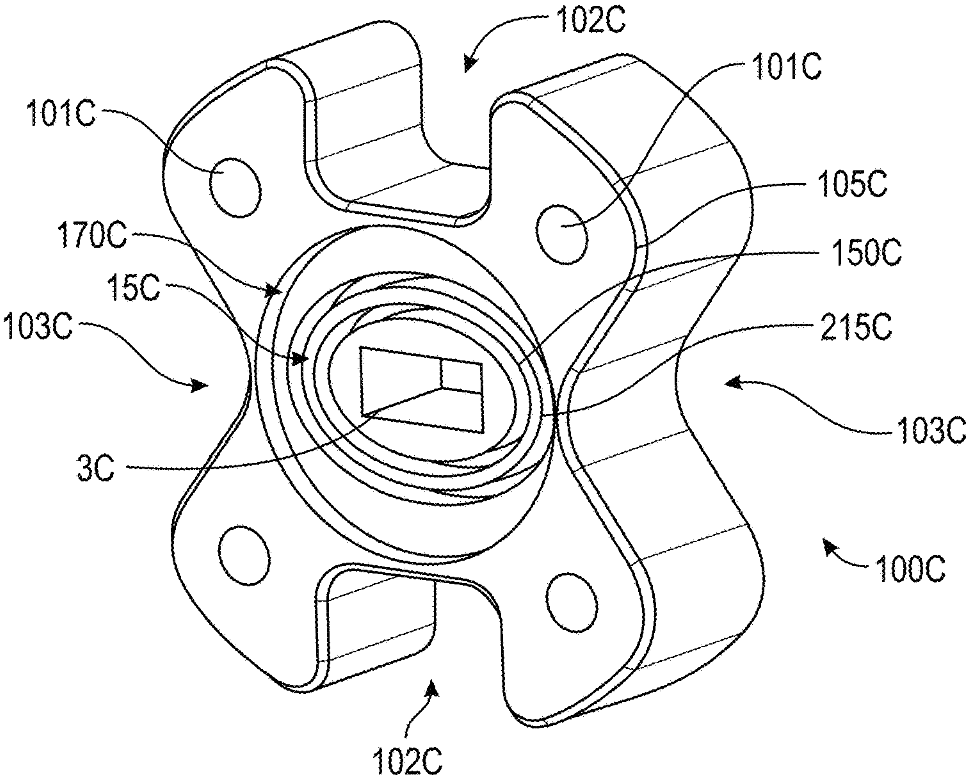
FIG. 8A shows another embodiment of a flange adapter element comprising grooves and ridges arranged to form an elliptic pattern around the waveguide opening and forming the periodic or quasi-periodic structure.
Figure 8B:
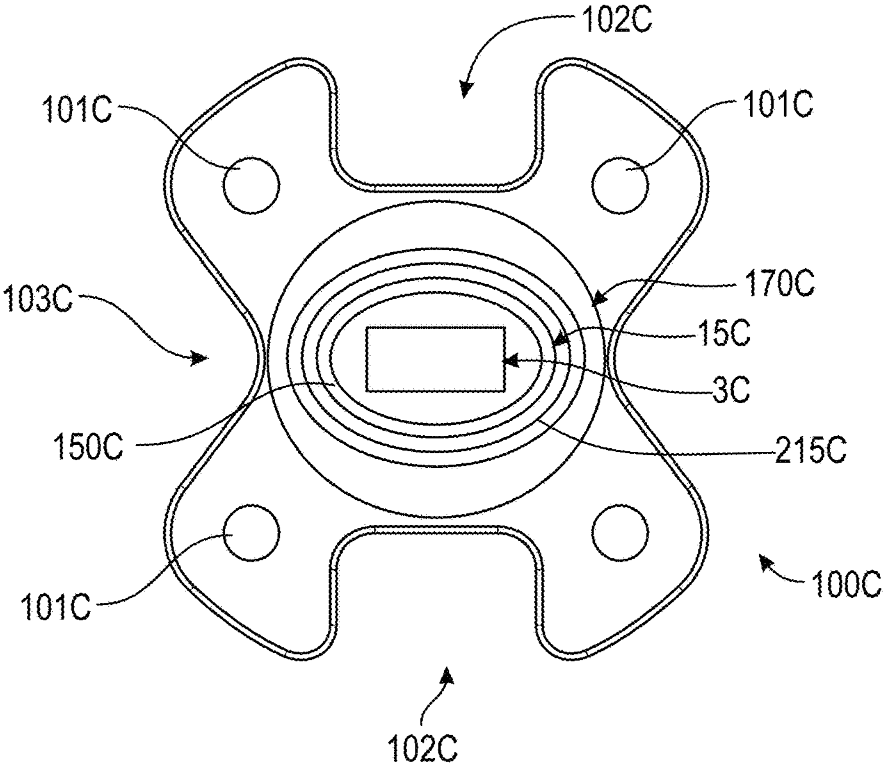
FIG. 8B is a front view of the flange adapter element of FIG. 8A.

FIG. 8A is a perspective view of a waveguide structure interconnecting arrangement 100C according to still another embodiment and comprising a flange adapter element 100C. Similar to the embodiment described with reference to FIG. 1, the flange adapter element 100C is adapted to be disposed between two waveguide flanges 10C, 20C (see FIGS. 9A, 9B). The flange adapter element 100C comprises a textured surface 15C with a number of protruding elements comprising a number of grooves 215C and ridges 150C (FIGS. 8A and 8B), for example two or three, or in some cases more, elliptically disposed around the waveguide opening 3C on a conductive surface to form a periodic or quasi-periodic structure on one side of the flange adapter element 100C. The depth of the grooves 215C is about λ/4 for a full-height implementation as shown in FIGS. 8A and 8B for interconnection with a waveguide flange with a smooth surface, and about λ/8 for half-height implementations as described with reference to FIGS. 6A, 6B, 6C, 7A, 7B, 7C and 7D but formed by a texture comprising elliptically arranged grooves (not shown).

Figure 9A:
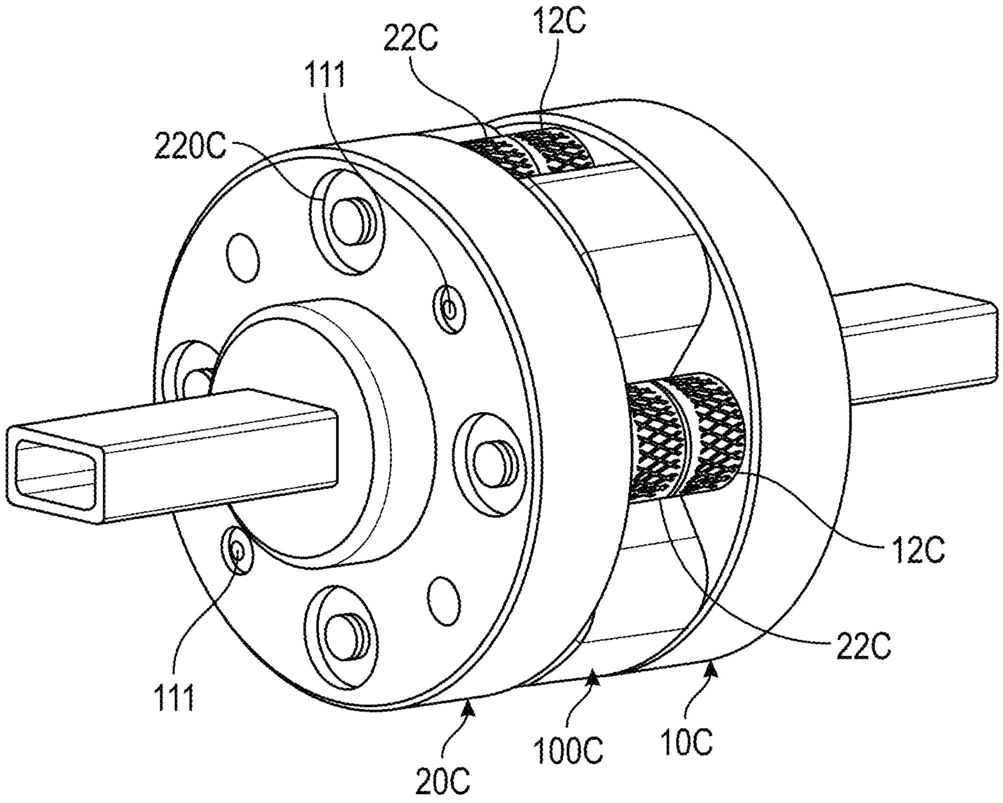
FIG. 9A is a view in perspective of a flange adapter element provided with a periodic or quasi-periodic structure comprising elliptically disposed grooves and ridges as in FIG. 8A interconnecting two waveguide flanges.
Figure 9B:
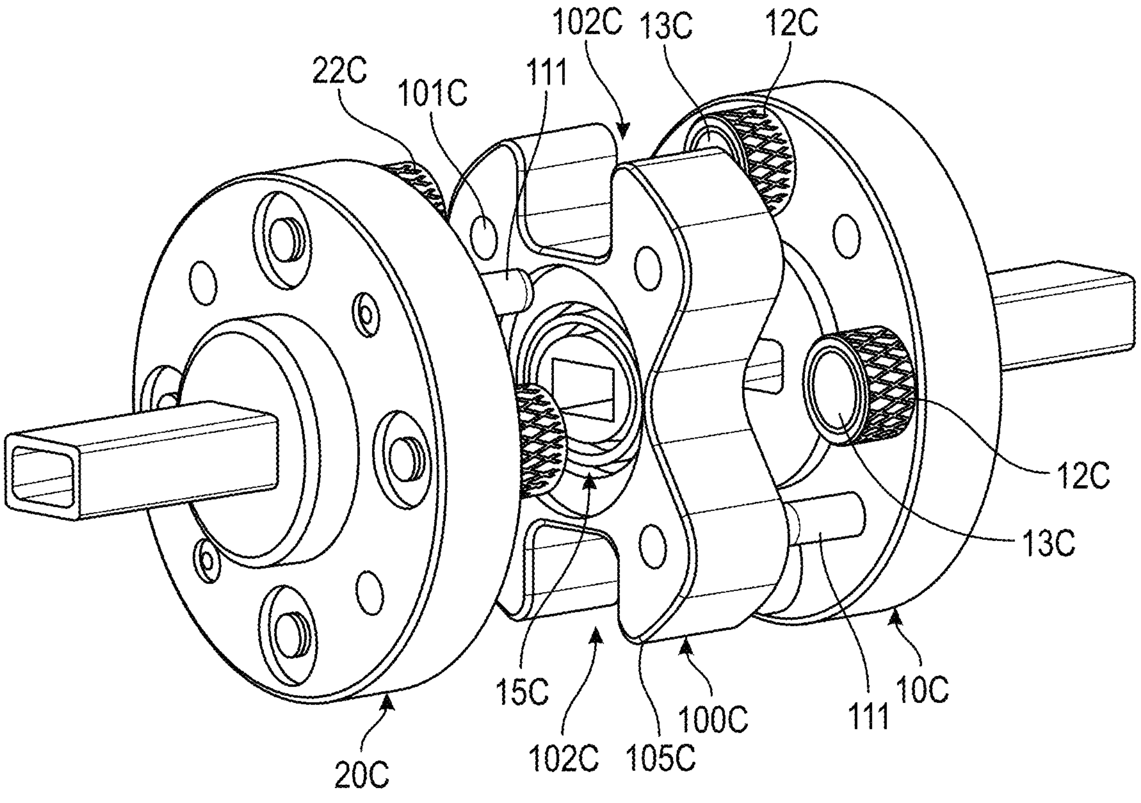
FIG. 9B is a view in perspective of the interconnecting arrangement and the waveguide flanges shown in FIG. 9A but in a non-interconnected state.

The flange adapter element 100C is adapted to provide an interconnection or joint between two waveguide structures with conventional smooth waveguide flanges 10C, 20C (see FIGS. 9A, 9B). A protective or supporting element, for example a rim, 105C is arranged to surround the periodic or quasiperiodic structure, i.e. the textured surface 15C, and the rim 105C acts as a protection of the protruding ridges between the grooves and can be said to act as a distance element assuring that, when interconnecting or fastening elements press the textured surface 15C against a waveguide flange with which the waveguide flange is to be interconnected, the pressure will be exerted on the protective, solid, surface, and the protruding elements, ridges 150C, between the grooves will be protected, as well as the interconnecting smooth flange surface. Since the protective or supporting element 105C is arranged to protrude a slight distance beyond the outer ends of the protruding elements, here the tops of the ridges, the presence of a gap will be assured, and the textured surface does not come into direct contact with the opposing waveguide flange 20C (FIGS. 9A, 9B) when fastened or interconnected.

The flange adapter element 100C comprises a number of alignment pin receiving holes 101C; in an embodiment, which are provided in a respective wing or flange section protruding from a central section 170C of the flange adapter element 100C where the textured surface 15C is located, in directions perpendicular to the direction of extension of the protruding elements 115C. The alignment pin receiving holes 101C serve the purpose of being adapted for receiving alignment pins 111 (for example, FIG. 9B) of waveguide flanges which are to be interconnected such as to assure that the waveguide flanges 10C, 20C and the flange adapter element 100C are appropriately aligned, and allowing sliding.

Between two respective, opposite, pairs of protruding wing or flange sections, through recesses, here, waists 103C are formed by flange adapter side walls, perpendicular to the textured surface 15C, tapering towards a central region outside the textured surface 15C on a respective side thereof disposed outside the waveguide opening 3C short or narrow side walls. Between two respective, opposite, pairs of protruding wings or flange sections through recesses 102C are formed by flange adapter side walls perpendicular to the textured surface 15C, which recesses are substantially U-shaped with a substantially straight section interconnecting the legs of the U and located outside the textured surface 15C at locations extending substantially in parallel with the long, wide, sides of the waveguide opening 3C. The waist shaped recesses 103C and the U-shaped recesses 102C are so shaped, and have such dimensions, as to allow a fastening element 12C, or a head thereof, (compare FIG. 9B) to be connected to the surface of a respective waveguide flange 10C (FIG. 9B), for example a standard waveguide flange, whereas the circumferential side walls of the wing or flange sections flange adapter element 100C are so shaped and have such dimensions as to correspond to the circumferential, peripheral, side walls of the respective waveguide flanges 10C, 20C. The positions of the waists and U-shaped recesses 102C, 103C are preferably so chosen that they correspond to locations where fastening screw holes are located for standard waveguide flanges.

FIG. 8B is a top view of the flange adapter element 1000 of FIG. 8A, the elements of which already have been discussed above.

FIG. 9A shows the flange adapter element 1000 disposed between two waveguide flanges 10C, 20C and the two waveguide flanges 10C, 20C are interconnected thereby and through interconnecting screws 12C, 22C with magnetic heads 13C, 23C (FIG. 9B) or with magnetic elements on the heads. FIG. 9A is similar to FIG. 3C but for a flange adapter element as in FIGS. 8A, 8B and hence with reference numerals as in FIGS. 8A, 8B, with reference to which also all elements have been discussed above.

FIG. 9B illustrates the two waveguide flanges 10C, 20C in a position for being interconnected by means of the flange adapter element 1000, and with the interconnecting elements, screws 12C, 22C introduced into the screw holes, (i.e. only screw hole 220C is shown in FIG. 9A) of the first and second waveguide flanges 10C, 20C. When the waveguide flanges 10C, 20C with the screws with magnetic heads 13C, 23C introduced into the screw holes are brought into contact with the flange adapter element 1000, such that the screw heads 13C, 23C are positioned in the through recess sections, i.e. here the U-shaped recesses and the waist sections, they will be automatically interconnected by means of the magnetic attraction between the magnetic screw heads 13C, 23C. By means of the alignment pins 111 the positioning will be accurate. Thus, interconnection takes place in an easy manner, like a snap-on operation. Although screws may still be needed, they can, for example, easily be applied or introduced into the screw holes of the waveguide flanges 10C, 20C on beforehand as also referred to above with respect to the embodiment shown in FIGS. 1, 2, 3 and 4. There is also no need to tighten any screws. Once the screws with magnetic heads, or magnetic elements on the heads, have been applied to the waveguide flanges, and they are brought in position on opposite sides of a flange adapter element 1000, the interconnection will take place in an almost automatic manner without requiring any particular skill of the personnel handling the assembly. Thereby interconnection, joining, removal, replacement of waveguide structures, or waveguide flanges, is considerably facilitated and can be done in an easy and fast manner, with a high accuracy and without needing to apply strong forces resulting in the risk of ruining the textured or smooth flange surfaces. The height of the screw head have already been discussed with reference to the embodiments presented in FIGS. 1, 2, 3, and 4, and the same conditions apply for embodiments with other textured surfaces, such as a corrugated structure, a structure with elliptic grooves etc. as also referred to above. Other examples are structures corresponding to embodiments as disclosed in FIGS. 5A, 5B, with a flange adapter element structure adapted for being fixedly connected to a waveguide flange, or be formed as a waveguide flange itself, or arranged for interconnection with another flange adapter element in which case both flange adapter elements are provided with half-height protruding elements of any kind, or, with protruding elements of such lengths as to in a cooperating pair, form a full-height protruding element, but with a gap between them.

In the following description some different textured surfaces and surrounding rim or ridge sections will be described, applicable to any waveguide flange adapter element or waveguide flange etc.

Figure 10A:
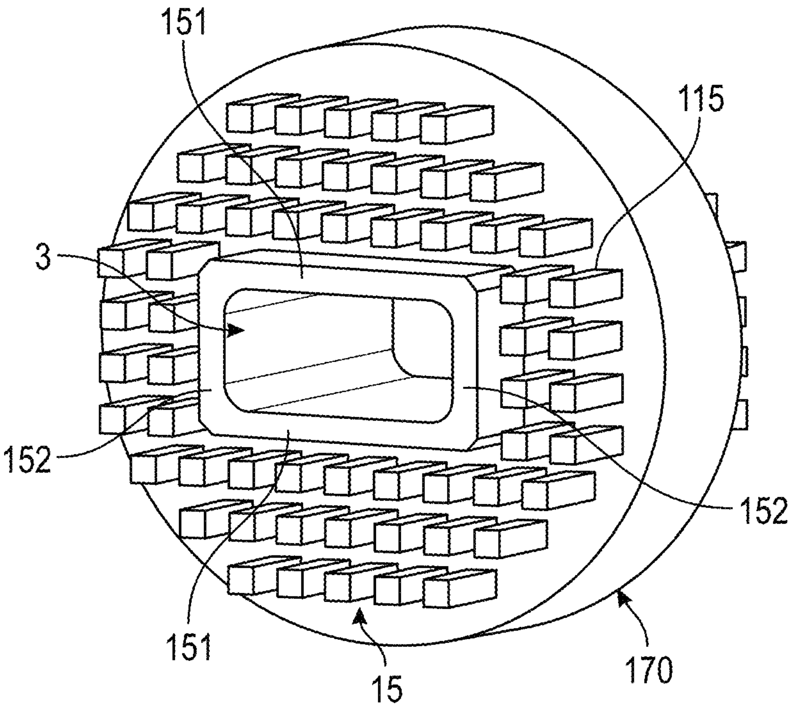
FIG. 10A is a view in perspective illustrating an exemplary structure comprising a periodic or quasi-periodic structure of a flange adapter element or a waveguide flange according to the invention.

FIG. 10A shows the central portion or structure 170 with a textured surface 15 of a flange adapter element as in FIG. 1 but here for a back-to-back flange adapter element; the functioning of the periodic or quasi-periodic structure however being the same irrespectively of the structure being a back-to-back implementation or a single-sided implementation. The textured surface 15, or the periodic or quasi-periodic structure here comprising pins 115 arranged for interconnection with an opposed smooth flange surface located such that there is a small air gap there between preventing waves from propagating in the gap between the surfaces. The condition for the stopband is imposed by the height of the pins 115, which may be around λ/4, λ being the wavelength in the media surrounding the pins, which is normally free space, but can also be a dielectric media.

The pins 115 can be thick or thin. Thick pins are preferable from a manufacturing point of view. A larger pin thickness to pin height ratio makes the production easier. However, standard flanges have a fixed size, so that there is a limited space to fit the pins into the standard flange, and each row of pins introduces an attenuation for the waves preventing them from leaking out. Therefore, thin pins are preferable for a better performance of the flange, that is, for having less leakage. The inventive concept covers the use of thick as well as thin pins, or other protruding elements which are thick or thin.

As also mentioned with reference to FIG. 1, the rim or ridge sections 151, 152 around the waveguide 3 opening is important for the electrical performance of the waveguide flange, and the dimensions therefore should not be selected arbitrarily. Also, fabrication aspects need to be considered. E. Pucci, P-S.Kildal, "Contactless Non-Leaking waveguide flange Realized by Bed of Nails for millimeter wave Applications", 6$^{th}$ European Conference on Antennas and Propagation (EUCAP), pp. 3533-3536, Prague, March 2012, as also referred to in the state of the art section, discloses the use of a ridge around the waveguide opening. This ridge has the same height as the pins have, and is much thicker along the wide side of the waveguide opening, and is referred to as an "Impedance Transformer". This thickness is about λg/4, which transforms an open circuit in a short circuit at the waveguide opening, in such way that the waves "see" a metal wall or electric contact even if physically there is a gap between the flanges where the waves could come in. A similar textured structure is used in some embodiments, for example with a difference that there is one more, shorter, row of pins outside the outermost row on the wide sides of the waveguide opening and that the walls of the short rim or ridge sections 152 are somewhat thicker.

Figure 10B:
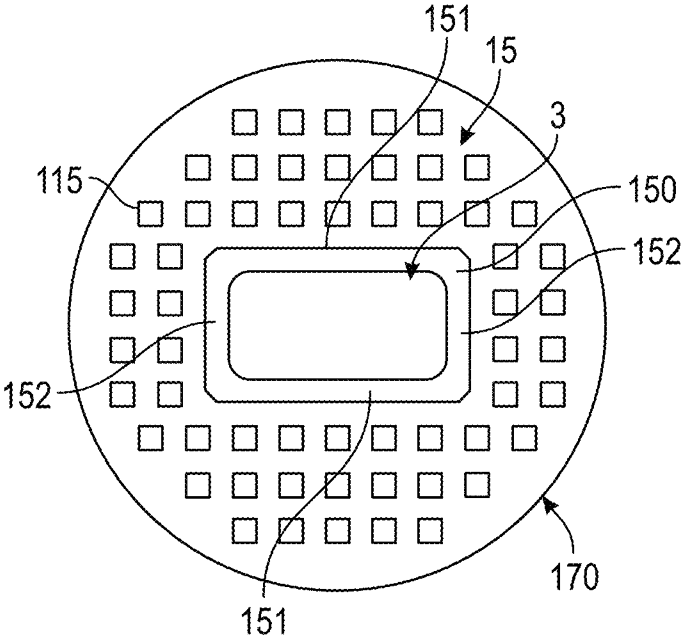
FIG. 10B is a top view of the exemplary periodic or quasi-periodic structure of FIG. 10A.

In FIG. 10B a top, or front, view of the textured structure 15 is shown.

The designs presented by Pucci et.al showed to not be suitable to be produced at 60 GHz. One of the designs of the ridge is a rectangular rim with a thickness of λ/4 along the wide walls of the waveguide opening, and has a thickness of only 50 μiη or even less along the narrow walls of the waveguide opening. Such a thickness is not appropriate from a manufacturing point of view. If on the other hand the thickness is increased, then it is not possible to cover the whole V-band of standard flanges (from 50 GHz to 75 GHz), which is a very wide band. This is due to a resonance appearing within the band.

Another design of a ridge around the waveguide opening is a circular rim that was used for a 200-300 GHz flange described in In S. Rahiminejad, E. Pucci, V. Vassilev, P-S.Kildal, S. Haasl, P. Enoksson, "Polymer Gap adapter for contactless, Robust, and fast Measurements at 220-325 GHz", Journal of Microelectromechanical Systems, Vol. 25, No. I, February 2016, as also referred to above, which however is also not suitable for a V-band flange where the dimensions of pins and ridges are electrically larger in terms of wavelength. The size of the flange is fixed and limited, so there is basically no room to fit pins in the flange if a circular design for the ridge around the waveguide opening is adopted.

Figure 11:
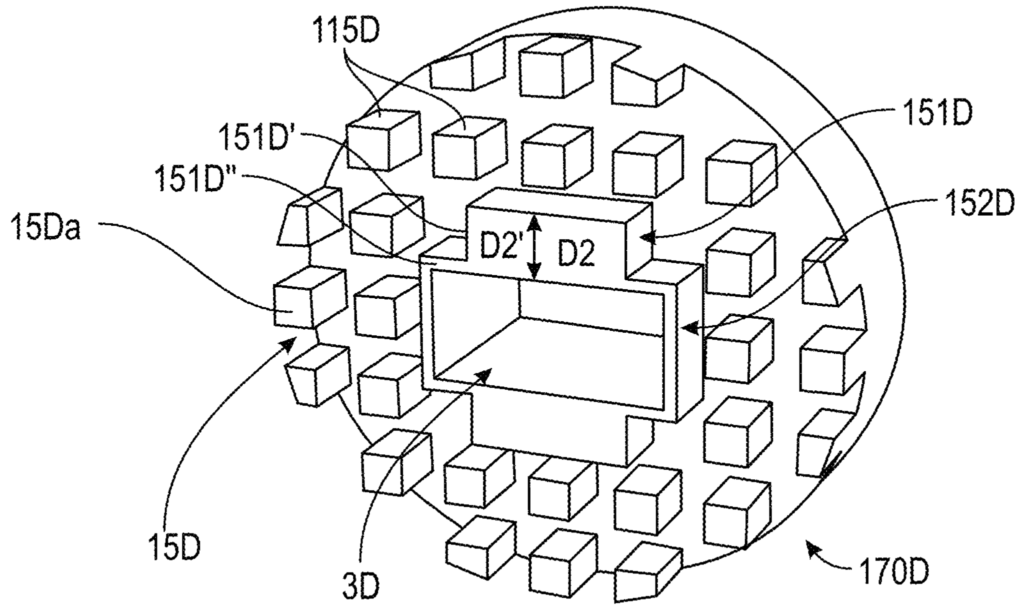
FIG. 11 is a schematic view in perspective illustrating an alternative structure of a single-sided flange adapter or waveguide flange according to the invention.

In FIG. 11 another embodiment of a central portion or structure 170D with a textured surface 15D comprising a number of protruding elements 15Da is disclosed. It has been realized that the long ridge or rim 151D also is important for stopping waves from propagating through the gap, and even makes it possible to reduce the number of rows of pins (or more generally protruding elements) needed for the design to even only one (see FIGS. 13A-13B). In the shown embodiment there are however two rows of pins 115D. The rectangular rim or ridge sections 151D, 152D around the waveguide 3D opening is modified in order to cover a larger frequency band, for example in some implementations the whole frequency band from 50 GHz to 75 GHz, although the invention of course not is limited thereto, but the invention may be adapted to cover any appropriate or desired frequency band. Advantageously the rim or ridge sections 152D on the narrow or short sides of the waveguide have a sufficient thickness to allow easy manufacture, for example between about 200-400 μm, preferably less than 400 μm. The rim or ridge sections 151D along the wide or long sides of the waveguide opening are divided into different sections, a central ridge section, also denoted a platform 151D', which has a thickness D2 of about λg/4, and outer narrower ridge sections 151D" with a thickness D2'. Thus, the central ridge section or platform 151D' does not have to extend all along the full length of the wide side of the waveguide opening.

The length L (FIG. 12) or extension of the central ridge section or platform 151D' can be optimized to give a good performance in terms of leakage within the frequency band of interest, in some embodiments, for example 50-75 GHz. It has also been realized that there is a relation between the thickness of the rim or ridge section 152D along the narrow side of the waveguide opening and the length of the ridge or platform 151D'. The larger the thickness of the short side rim or ridge 152D, the shorter the length L of the central ridge section, platform, 151D'.

For exemplifying reasons only, and by no means for limiting purposes, some exemplary dimensions are given for some different embodiments for a 60 GHz flange adapter element. In one embodiment thick pins are used having, for example, a diameter of about 670 μm, and a height of about 1110 μm (full height). The wall thickness may, for example, be 200 μm in H-plane (thickness of walls of short ridge section 152D and outer ridge sections, 151D"), and λg/4 in E-plane, corresponding to the thickness of the wall of the central ridge section 151D'. The air gap may be about 100 μm and the flange may have a total thickness of about 6.6 mm.

In one embodiment for a 60 GHz flange adapter element thin pins are used having, for example, a diameter of about 400 μm. The wall thickness may, for example, be 200 μm in H-plane (thickness of walls of short ridge section 152D and outer ridge sections, 151D"), and λg/4 in E-plane, corresponding to the thickness of the wall of the central ridge section 151D'. The air gap may be about 100 μm and the flange may have a total thickness of about 6.6 mm.

In still another embodiment for a 60 GHz flange adapter element thin pins are used having, for example, a diameter of about 400 μm and a wall thickness of about 300 μm in H-plane is used (thickness of walls of short ridge section 152D and outer ridge sections, 151D"), and λg/4 in E-plane, corresponding to the thickness of the wall of the central ridge section 151D'. The air gap may be about 100 μm and the flange may have a total thickness of about 6.8 mm.

Figure 12:
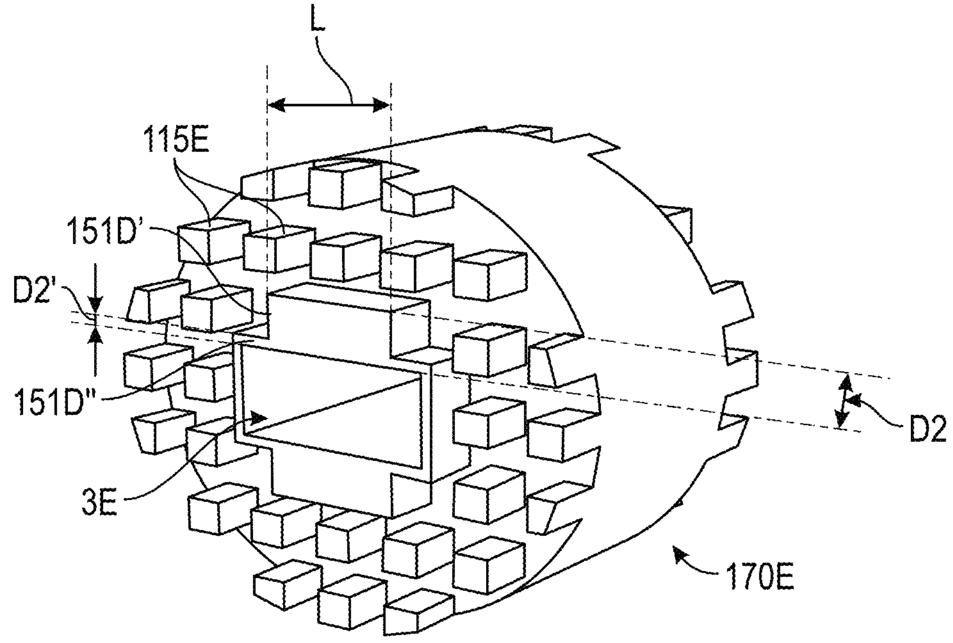
FIG. 12 is a schematic view in perspective showing an exemplary back-to-back flange adapter element with a structure as in FIG. 11.

FIG. 12 shows a central section or structure 170E with a textured surface and a waveguide surrounding rim or ridge structure as in FIG. 11 in a back-to-back implementation, i.e. with the same periodic or quasi-periodic structures on both sides around the waveguide openings 3E. Similar elements bear the same reference numerals as in FIG. 11 but indexed "E" and will therefore not be further discussed herein. For example, pins 115E are shown in FIG. 12.

Figure 13A:
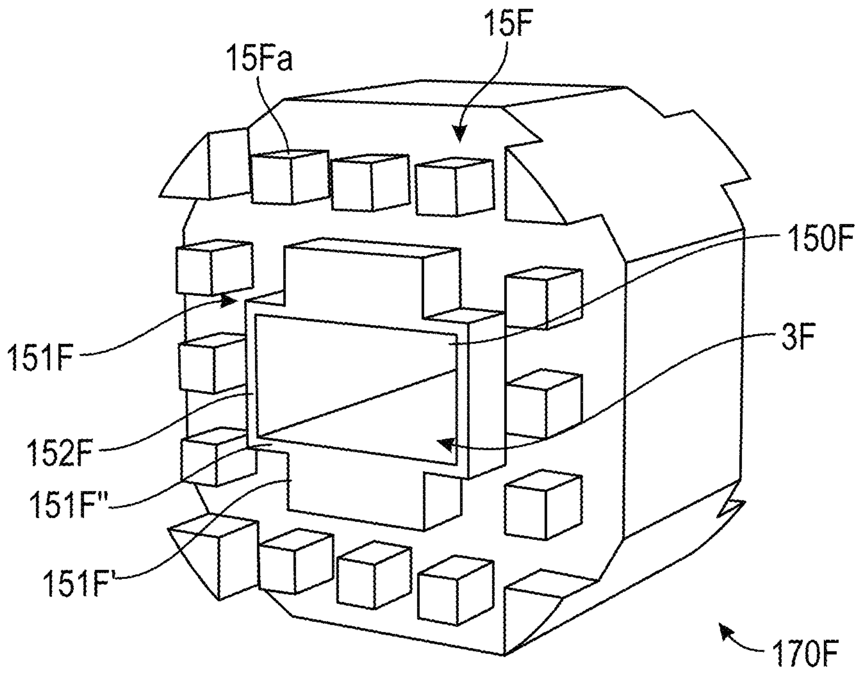
FIG. 13A is a schematic view in perspective showing an alternative embodiment of a structure of a back-to-back flange adapter element according to the invention.

FIG. 13A shows another embodiment of a central portion or structure 170F with a textured surface 15F comprising a number of protruding elements 15Fa. As discussed above with reference to FIG. 11, through the realization that the long ridge or rim section 151F also is important for stopping waves from propagating through the gap, implementations with but one row of protruding elements 15Fa having pins 115F (FIG. 13B) on each side of the waveguide opening are advantageous, one example of which is shown in FIG. 13A. The rectangular rim or ridge sections 151F, 152F (rim or ridge 150F) around the waveguide opening 3F are modified in order to cover a larger frequency band, for example, in some implementations the whole frequency band from 50 GHz to 75 GHz, although the invention of course not is limited thereto, but the invention may be adapted to cover any appropriate or desired frequency band. Advantageously the rim or ridge sections 152F on the narrow or short sides of the waveguide have a sufficient thickness to allow easy manufacture, for example, between about 200-400 μm, preferably less than 400 μm. The rim or ridge sections 151F along the wide or long sides of the waveguide opening are divided into different sections, a central ridge section, also denoted a platform, 151F' which has a thickness of about λg/4, and outer narrower ridge sections 151F". The central ridge section or platform 151F' does not extend all along the full length of the wide side of the waveguide 3F opening.

Figure 13B:
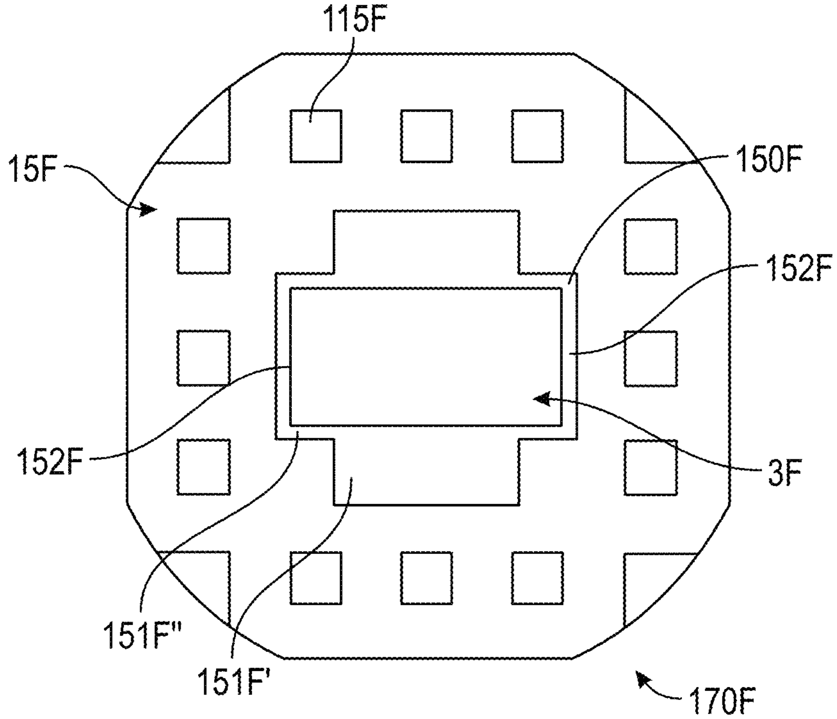
FIG. 13B is a schematic front (top) view of the flange adapter element structure shown in FIG. 13A.

The length L (shown in FIG. 12) or extension of the central ridge section or platform 151F' can be optimized to have a good performance in terms of leakage within the frequency band of interest, in some embodiments, for example, 50-75 GHz. As also referred to above, there is a relation between the thickness of the rim or ridge section 152F along the narrow side of the waveguide opening and the length of the ridge or platform 151F' provided on the wide side. The larger the thickness of the short side rim or ridge section 152F, the shorter the length L (shown in FIG. 12) of the central ridge section, platform, 151F' and vice versa. FIG. 13B is a top view of the central section 170F of FIG. 13A shown merely for illustrative purposes.

Figure 14A:
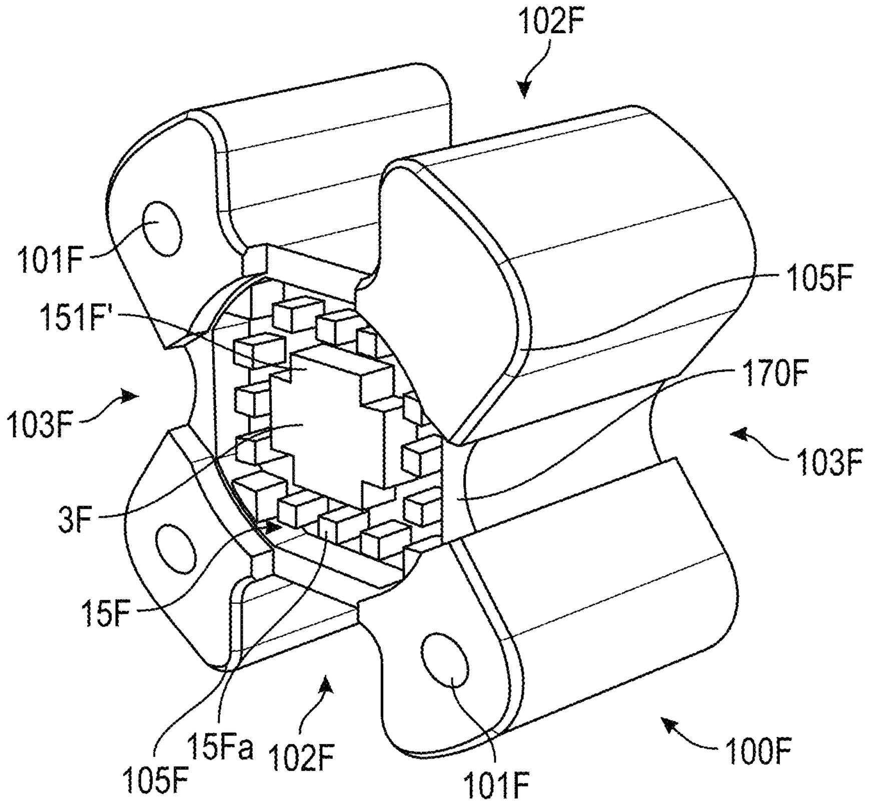
FIG. 14A is a schematic view in perspective showing a back-to-back flange adapter element with a periodic or quasi-periodic structure or texture as shown in FIG. 13A.

FIG. 14A shows an embodiment of a flange adapter element comprising a central section or structure 170F as in FIG. 13A, which therefore will not be further discussed herein, and which is provided with an outer protective or supporting section or element, for example a rim, 105F (see also reference numeral 105 in FIG. 1) which is disposed such as to surround the periodic or quasiperiodic structure 15F, i.e. the textured surface. The shape of the outer protective or supporting section or element 105F, for example, a rim or similar, is not important for the electrical performance, but the shape is important to provide a support or a contact surface when two flanges are connected together, to protect the flange surfaces (smooth or textured) from damage. The shape of the outer protective or supporting section or element 105F also contributes in providing a fixed gap between flanges, since the height of such an the outer protective or supporting section or element, rim, 105F is equal to the height of the protruding elements 15Fa plus the gap for full-height protruding element structures, and the height of the protruding elements plus half the gap for half-height protruding element structures, or correspondingly if different heights are used for the protruding elements.

As for the embodiment described with reference to FIGS. 14A and 14B, the flange adapter element 100F comprises wings or protruding sections in which alignment pin holes 101F are provided, and between recesses, for example, comprising U-shaped recesses 102F and waists 103F, are provided such as to leave space for fastening elements, for example, screws, with magnetic heads or magnetic portions attached to the heads or similar as also discussed earlier in the application, and therefore not will be further described here.

Figure 14B:
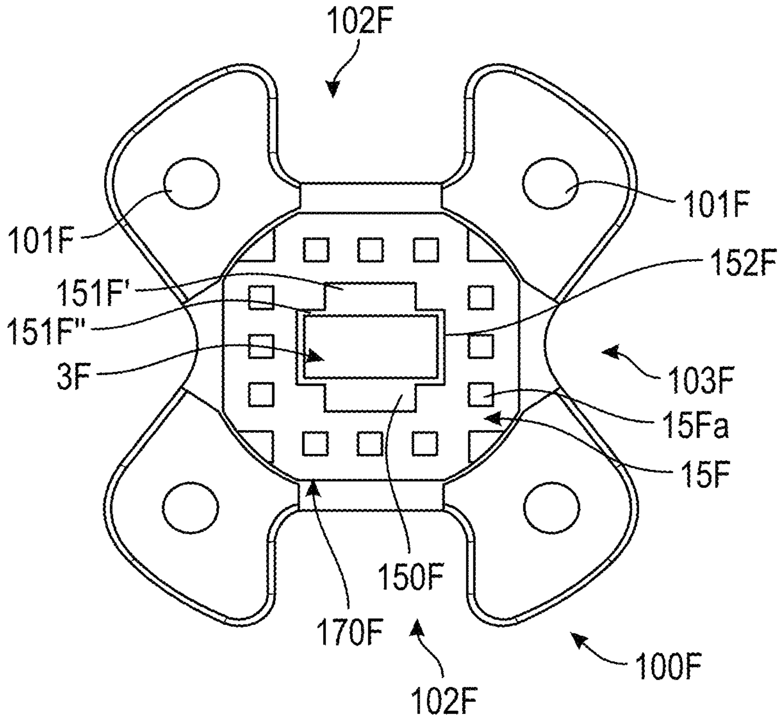
FIG. 14B is a front view of the flange adapter element of FIG. 14A.

FIG. 14B is a top view of the flange adapter element 100F of FIG. 14A shown merely for illustrative purposes.

Figure 15A:
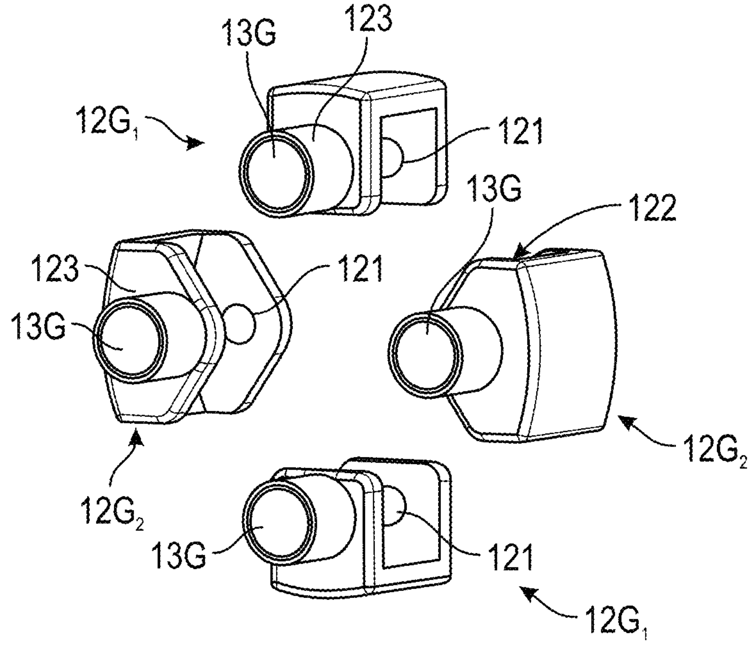
FIG. 15A is a view in perspective showing four interconnecting elements according to an alternative embodiment.
Figure 15B:
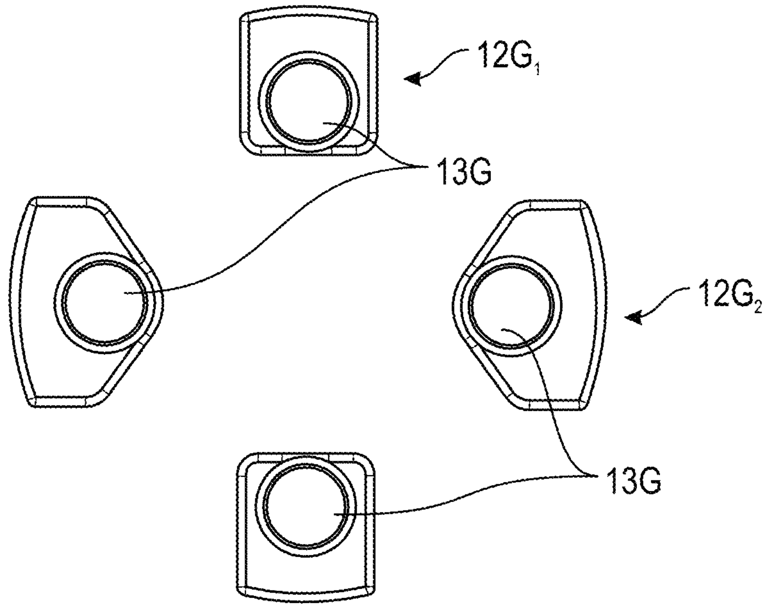
FIG. 15B is a top view of the interconnecting elements of FIG. 15A.
Figure 15C:
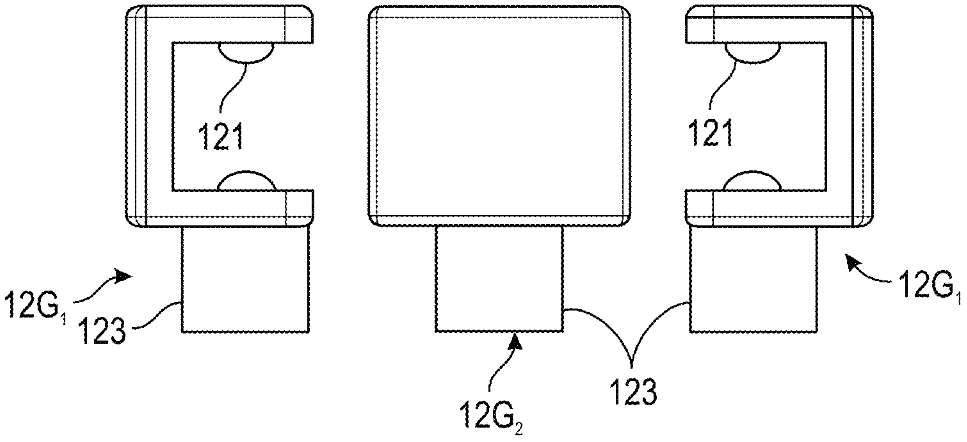
FIG. 15C is a side view of the interconnecting elements of FIG. 15A.

In FIG. 15A a set of alternative interconnecting elements 12$G_1$, 12$G_2$, is illustrated. Top and side views are shown in FIGS. 15B, 15C. The use of such interconnecting elements, or fastening elements, is particular advantageous in overcoming problems with flange adapter elements having different depths or thicknesses, and when magnetic elements should be fastened to already existing or fabricated screws. The solution here comprises the use of a fastening system comprising, here, four separate interconnecting elements also serving as fasteners. They have a shape adapted to the shape of a flange adapter element as described earlier in the application; a particular implementation is shown in FIG. 16B. Elements not specific for this embodiment are not described in detail since the have already been described with reference to preceding embodiments, and like elements are given the same reference numerals but referenced "G".

FIGS. 15A and 15B show two different (and mirrored) shapes of interconnecting (or fastening) elements, first interconnecting elements 12$G_1$, also referred to as "top/bottom fasteners", and second interconnecting elements 12$G_2$, also referred to as "side fasteners". Thereby, the semantic look is increased and the risk of incorrect mounting is reduced. Except for the outer shape, the design of the interconnecting elements 12$G_1$, 12$G_2$ is similar. In one embodiment these interconnecting elements have a shell-shaped configuration 122 (FIG. 15A) adapted to the shape, for example, of a WR15-flange. Internally these interconnecting elements are provided with dome-shaped protrusions 121 (FIG. 15A) adapted to allow connection to existing screw holes of the waveguide flange. On the front side cylindrical casings 123 (FIG. 15A) provided for reception of permanent magnet elements 13G, for example, 3×2 mm neodymium magnets.

Figure 16A:
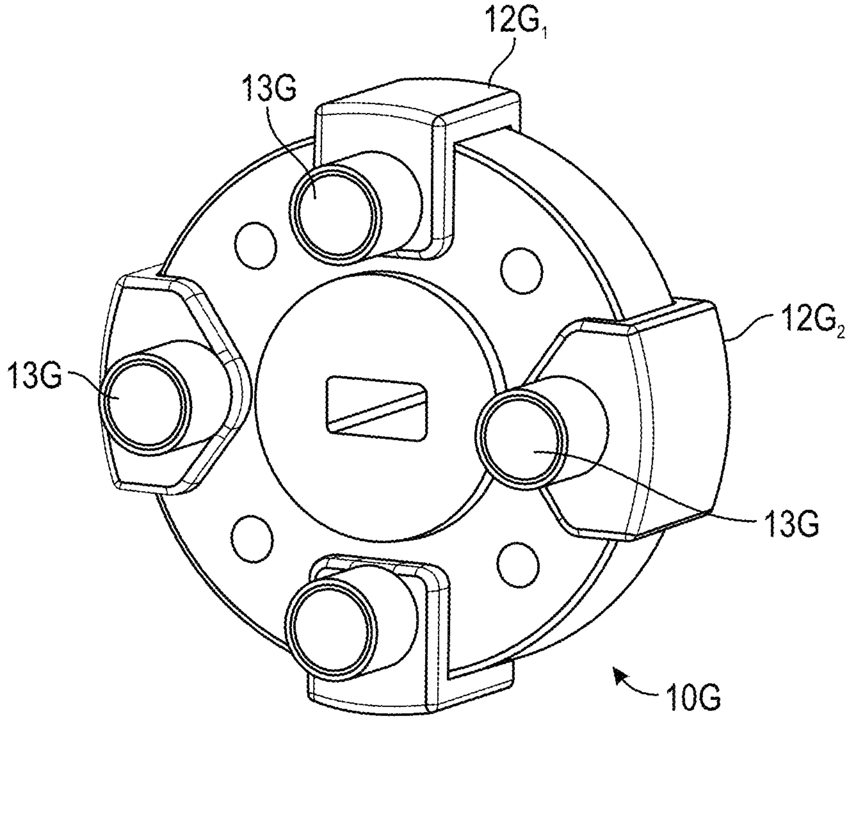
FIG. 16A is a view in perspective of a waveguide flange to which the interconnecting elements of FIG. 15A are connected but without alignment pins.
Figure 16B:
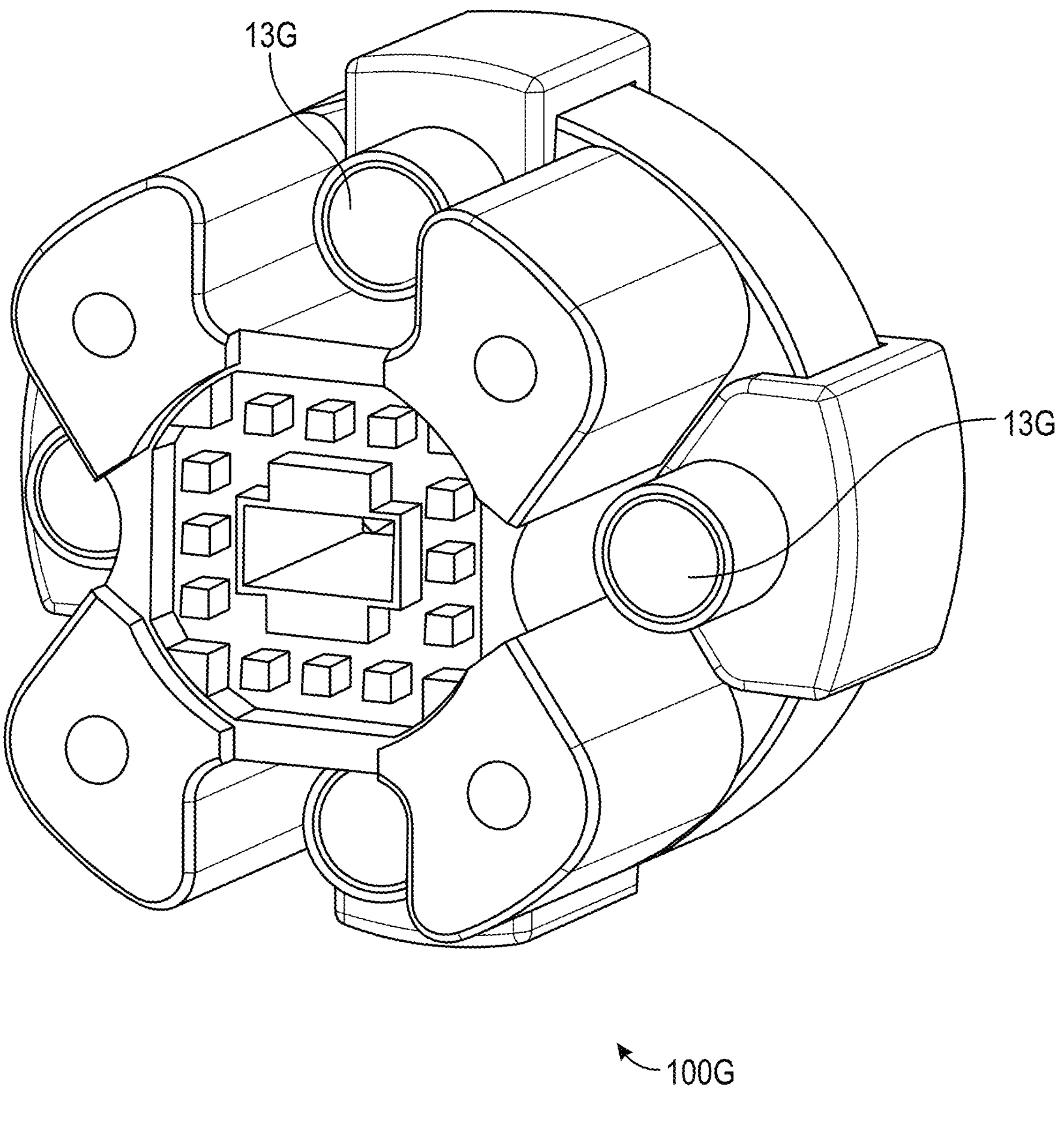
FIG. 16B is a view in perspective of a flange adapter element connected to a waveguide flange by means of interconnecting elements as in FIG. 14A.

The interconnecting elements 12$G_1$, 12$G_2$, can easily be applied to a waveguide flange 10G, for example, a WR15-flange by snapping them into place towards the center of the flange 10G as shown in FIG. 16A. The dome-shaped protrusions 121 (FIG. 15C) and the radial shell shape 122 (FIG. 15A) ensure that the interconnecting elements are fixed in place or position. Once the interconnecting elements 12$G_1$, 12$G_2$, (FIGS. 15B and 15C) have been applied onto the waveguide flange 10G (FIG. 16A), a flange gap adapter element 100G (FIG. 16B) can be mounted using alignment pins as described, for example, with reference to FIGS. 3A, 3B. The shapes of the interconnecting elements and the alignment pins ensure that the flange adapter element 100G (FIG. 16B) will not be mounted incorrectly. By mounting four interconnecting elements or fasteners to an interconnecting waveguide flange (not shown) as shown in FIGS. 16A, and 16B the interconnection will be completed by aligning the waveguide flange onto the flange adapter element 100G, where the waveguide flange will be held in place by means of magnetic elements as described earlier in the application. Preferably the interconnecting elements are attached to the waveguide flange before the flange adapter element 100G in order to avoid damage to the flange adapter element, although it is not a requirement. For detachment of the interconnecting elements, they are simply pulled from the center of the flange and drawn outwards. In advantageous embodiments the interconnecting elements 12$G_1$, 12$G_2$, (FIG. 15A) are made of plastic to provide for good elastic properties for mounting and detachment purposes. In other embodiments they are made of metal.

The interconnecting elements 12$G_1$ and 12$G_2$ (FIG. 15A) may then be attached by means of screws from the backside of the waveguide flange.

The interconnecting elements may, for example, be fabricated by means of jet molding or liquid injection molding. Of course also other fabrication methods are possible as well.

It should be clear that the invention is not limited to the illustrated embodiments but that the invention can be varied in a large number of ways, and features of the different embodiments can be freely combined. Particularly the periodic or quasi-periodic structures, textures, can be of many different kinds, i.e. the type, shape and size and arrangement of protruding elements, and the dimensions be scaled for different frequency bands, some figures are, for example, given for 60 GHz implementations as far as dimensions of protruding elements, thicknesses of ridge sections around the waveguide opening etc. are concerned. It should also be clear that a flange adapter element can be implemented as a separate part allowing releasable connection to waveguide flanges, guided and slidable by means of alignment pins, or comprise a waveguide flange itself, or be adapted for fixed connection to a waveguide flange. Flange adapter elements may also be provided as back-to-back flange adapter elements or single sided elements. Still further, interconnecting elements may comprise magnetic screw heads, or magnets connected to screw heads by means of gluing or similar, or magnetic elements attached to other interconnecting elements, as well as magnetic elements may be fastened on, or to, waveguide flanges or, particularly for flange adapter elements to be connected fixedly to a waveguide flange, or a flange support element (see for example, reference numeral 145A in FIG. 5A) by gluing, for example, in small recesses or cavities or externally on the surface. Also the shapes and sizes of the wing sections, or the intermediate recesses admitting room for interconnecting elements (for example, screws with magnetic elements), can be varied in different manners, only some exemplifying embodiments being shown. It is also possible to use other fastening elements than screws with magnets, or magnets as such. Particular implementations refer to flange adapter elements with a surrounding protective or supporting rim as such, independently of type of interconnecting elements.

In some embodiments the textured surface, i.e. the periodic or quasi-periodic structure, comprises a number of square shaped pins, with cross-sectional area dimension of $(0.15\lambda)^2$ and a height of $0.15\lambda$-$0.25\lambda$, surrounding a waveguide opening. The textured surface may also comprise a corrugated structure with a plurality of concentrically or elliptically disposed corrugations with grooves surrounding a waveguide opening.

As referred to above, the width, or cross-sectional dimension/the height of the pins or corrugations of any appropriate kind is determined by the desired frequency band. The higher the frequency band, the smaller the dimensions, and the dimensions scale linearly with the wavelength; the higher the frequency, the smaller the wavelength, and the smaller the dimensions. For a frequency band, by wavelength is here meant the wavelength of the center frequency of the corresponding frequency band.

It is an advantage of the invention that, when magnetic interconnecting elements are used, a flange adapter element can be easily connected, loosened and reused in many different flange connections. It is also an advantage, that when, for example, magnetic elements are used, connection and release is much faster than if other fastening mechanisms are used.

The concepts of the present invention are also applicable to circular waveguides. The concepts are also applicable to waveguide flanges which are not circular, but, for example, rectangular.

The present invention particularly can be used for connecting a microwave or millimeter wave tool or instrument to a microwave or millimeter circuit or device, or a device under test (DUT) or a calibration arrangement for a tool or instrument for analyzing or measuring microwave or millimeter circuits or devices. With a microwave instrument is here also meant devices for frequencies up to and above THz frequency.

It is an advantage that a waveguide interconnection arrangement is provided which facilitates interconnection using existing standard waveguide flanges.

The waveguide structure interconnecting arrangement further is compact and easy to assemble and reassemble. It is also a particular advantage that the presence of a gap, enables relative displacement between the surfaces, for example, two textured surfaces or a textured surface and a smooth surface, which is of advantage in some implementations, for example, during calibration procedures etc. when a flange needs to be moved.

It should be noted that the gap between surfaces is described as a gap, in some cases the gap may be substantially zero gap, the main point being that there is no requirement for any electrical contact between the two surfaces.

The invention claimed is:

1. An arrangement for interconnecting waveguide components, comprising:

a waveguide flange adapter element having a first waveguide opening and being configured to provide an interconnection between first and second waveguide structures;

a first waveguide flange of the first waveguide structure having a second waveguide opening;

the waveguide flange adapter element comprising a first surface of a conductive material with a periodic or quasi-periodic structure formed by a number of protruding elements surrounding the first waveguide opening, the protruding elements extending from the first surface and having outer ends spaced from the first surface;

an interconnector configured to releasably or fixedly interconnect the waveguide flange adapter element to the first waveguide flange without requiring electrical contact and to provide a first gap between a second surface around the first waveguide opening and the second waveguide opening and provide a second gap between the first surface and a third surface around the second waveguide opening assuring that the first surface is not in direct mechanical contact with the third surface of the first waveguide flange, wherein the number of protruding elements surrounding the first waveguide opening allow waves to pass across the first gap in a desired direction or waveguide path, at least in an intended frequency band of operation, and that stop propagation of waves in the first gap in other directions;

wherein the second gap is smaller than λ/4, where λ is a wavelength in a medium surrounding the protruding elements of a waveguide signal to be measured, the interconnector comprises a rim or a ridge extending from the first surface and at least partly surrounding the periodically or quasi-periodically arranged protruding elements to provide the second gap, wherein the rim or ridge is arranged to extend from the first surface beyond the outer ends of the protruding elements, hence assuring that the outer ends of the protruding elements do not come in direct mechanical contact with the first waveguide flange; and wherein the waveguide flange adapter element comprises alignment pin holes substantially symmetrically disposed around, and at a distance from, the first surface, and the waveguide flange adapter element being aligned with respect to the first waveguide flange by alignment pins introduced into the alignment pin holes and into cooperating pin holes in the first waveguide flange to interconnect the waveguide flange adapter element to the first waveguide flange.

2. The arrangement of claim 1, further comprising a second waveguide flange of the second waveguide structure or a second waveguide flange adapter element connected to the waveguide flange adapter element, wherein the second waveguide flange or the second waveguide flange adapter element is interconnected to the first waveguide flange through the waveguide adapter element.

3. The arrangement of claim 1, wherein the interconnector further comprises interconnecting elements; the waveguide flange adapter element comprises a number of through recesses, protruding sections, or wing portions for receiving at least a portion of the interconnecting elements; the interconnecting elements comprise magnetic elements or magnetic portions adapted for cooperating with magnetic elements of the first waveguide flange.

4. The arrangement of claim 3, wherein the waveguide flange adapter element is interposed and aligned between the first waveguide flange of the first waveguide structure and a second waveguide flange of the second waveguide structure, and the first waveguide flange and the second waveguide flange are interconnected through the waveguide flange adapter element.

5. The arrangement of claim 1, wherein the waveguide flange adapter element interconnects the first waveguide flange to a second waveguide flange of the second waveguide structure, the first waveguide flange has an associated smooth surface; and the first surface faces the smooth surface of the first waveguide flange.

6. The arrangement of claim 5, wherein the waveguide flange adapter element is connected to the smooth surface of the first waveguide flange by fasteners or glue.

7. The arrangement of claim 1, wherein the first waveguide structure is interconnected to the second waveguide structure by the waveguide flange adapter, the first surface of the waveguide flange adapter element is optimized for providing a low reflection coefficient and a high transmission coefficient, respectively between the first and second waveguide structures connected by the waveguide flange adapter element; the first waveguide flange has a smooth conductive surface, and a height of the number of protruding elements is between substantially λ/4-λ/2.

8. The arrangement of claim 7, wherein the rim or ridge further comprising rim or ridge sections that surround the first surface of the waveguide flange adapter element.

9. The arrangement of claim 8, wherein a wall thickness of the rim or ridge section is about $\lambda_g/4$, $\lambda_g$ being a wavelength in the waveguide flange adapter element.

10. The arrangement of claim 1, wherein the number of protruding elements of the periodic or quasi-periodic structure are arranged in at least one row around the first waveguide opening.

11. The arrangement of claim 1, wherein the periodic or quasi-periodic structure provides a stopband for waves leaking out from a gap between the first waveguide flanges and a second waveguide flange of the second waveguide structure, such that waves passing from the second waveguide opening in the first waveguide flange to a third waveguide opening in the second waveguide flange are unaffected.

12. The arrangement of claim 1, wherein the rim or ridge further comprises rim or ridge sections surround the first waveguide opening in the waveguide flange adapter element, around which the periodic or quasi-periodic structure is disposed.

13. The arrangement of claim 12, wherein the number of protruding elements of the periodic or quasi-periodic structure are arranged in between one and four rows around the first waveguide opening.

14. The arrangement of claim 1, further comprising a second waveguide flange adapter element interconnected to the first waveguide flange adapter element, wherein a height of the protruding elements is between λ/8-λ/4 for the waveguide flange adapter element interconnected with the second waveguide flange adapter element.

15. The arrangement of claim 1, wherein the interconnector further comprises interconnecting elements; the waveguide flange adapter element comprises a number of through recesses, protruding sections, or wing portions for receiving at least a portion of the interconnecting elements; at least some of the interconnecting elements include at least one of snap-on elements, clip-on elements, clamping elements, and fasteners with magnetic heads or elements fixedly or releasably connected thereto.

16. An arrangement for interconnecting waveguide components, comprising:

first and second waveguide flange adapter elements, the first waveguide flange adapter element comprising a first surface of a conductive material with a periodic or quasi-periodic structure formed by a number of first protruding elements surrounding a first waveguide opening, the second waveguide flange adapter element comprising a second surface of a conductive material with a periodic or quasi-periodic structure formed by a number of second protruding elements surrounding a second waveguide opening;

a first protruding element of the first protruding elements faces a second protruding element of the second protruding elements;

the facing first and second protruding elements each have a height or length such that a total height or length of the facing first and second protruding elements is a full length of the periodic or quasi-periodic structure needed to stop propagation of waves inside a second gap between the first and second waveguide flange adapter elements in any direction and to allow waves to pass across a first gap from the first waveguide opening to the second waveguide opening in an intended frequency band;

an interconnector configured for interconnecting the first and second waveguide flange adapter elements without requiring electrical contact and with assuring that the first surface is not in direct mechanical contact with the second surface;

wherein the second gap is smaller than λ/4, where λ is a wavelength in a medium surrounding the protruding elements of a waveguide signal to be measured, and wherein the interconnector comprises a rim, a ridge, a protective element or layer, or a supportive element or layer that at least partly surrounds a surface formed by the periodically or quasi-periodically arranged protruding elements.

17. The arrangement of claim 16, wherein the first waveguide flange adapter element is interconnected a first waveguide flange of a first waveguide structure and the second waveguide flange adapter element is interconnected to a second waveguide flange of a second waveguide structure.

18. The arrangement of claim 17, wherein the first waveguide flange has an associated smooth surface attached to the first waveguide flange adapter element.

19. The arrangement of claim 16, wherein the rim or ridge further comprising rim or ridge sections that surround the first surface of the first waveguide flange adapter element.

20. The arrangement of claim 16, wherein each waveguide flange adapter element comprises four protruding sections or wing sections disposed around the corresponding surface and a corresponding hole in each protruding section or wing section adapted for receiving an interconnecting element.

21. An arrangement for interconnection of waveguide structures or components comprising:

a waveguide flange adapter element comprising a surface of a conductive material with a waveguide opening and a periodic or quasi-periodic structure formed by a number of protruding elements arranged around said waveguide opening, the protruding elements arranged or designed to allow waves to pass through said waveguide opening in a desired direction or waveguide path, at least in an intended frequency band of operation, and to stop propagation of waves in other directions, wherein the waveguide flange adapter element comprises a rim or ridge allowing interconnection with a waveguide flange or another waveguide flange adapter element without requiring electrical or conductive contact, the rim or ridge at least partly surrounding the surface formed by the periodically or quasi-periodically arranged protruding elements, wherein the rim or ridge is arranged to protrude beyond outer ends of the protruding elements, hence assuring that the surface formed by the periodically or quasi-periodically arranged protruding elements do not come in direct mechanical contact with an opposite, interconnecting, the waveguide flange or the waveguide flange adapter element.

* * * * *